US010782605B2

(12) United States Patent
Fan et al.

(10) Patent No.: US 10,782,605 B2
(45) Date of Patent: Sep. 22, 2020

(54) LIGHT TUNNELS AND METHODS FOR MAKING SAME

(71) Applicant: Materion Precision Optics (Shanghai) Limited, Shanghai (CN)

(72) Inventors: Jie Fan, Shanghai (CN); Qiming Li, Shanghai (CN)

(73) Assignee: MATERION PRECISION OPTICS (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 16/637,312

(22) PCT Filed: Sep. 1, 2017

(86) PCT No.: PCT/CN2017/100164
§ 371 (c)(1),
(2) Date: Feb. 7, 2020

(87) PCT Pub. No.: WO2019/041305
PCT Pub. Date: Mar. 7, 2019

(65) Prior Publication Data
US 2020/0233193 A1    Jul. 23, 2020

(51) Int. Cl.
*G03B 21/20*       (2006.01)
*F21V 7/00*        (2006.01)
(Continued)

(52) U.S. Cl.
CPC ........ *G03B 21/2066* (2013.01); *F21V 7/0033* (2013.01); *F21V 9/30* (2018.02);
(Continued)

(58) Field of Classification Search
CPC .............. G03B 21/2066; G03B 21/204; G03B 21/208; F21V 13/08; G02B 17/0668–0673; G02B 6/0096
See application file for complete search history.

(56) References Cited

U.S. PATENT DOCUMENTS

| 7,386,215 B1 * | 6/2008 | Chang .................. G02B 6/0096 353/122 |
| 2002/0118946 A1 * | 8/2002 | Wagner .................. G02B 27/09 385/146 |

(Continued)

FOREIGN PATENT DOCUMENTS

| CN | 2586989 | 11/2003 |
| CN | 1710462 | 12/2005 |

(Continued)

OTHER PUBLICATIONS

International Search Report for corresponding patent application No. PCT/CN2017/100164 dated May 30, 2018.

*Primary Examiner* — Mariceli Santiago
(74) *Attorney, Agent, or Firm* — Tucker Ellis LLP

(57) ABSTRACT

Light tunnels, methods for forming a light tunnel, and apparatuses including light tunnels are disclosed herein. A light tunnel includes a plurality of reflectors cooperatively engaging with one another by a series of notches therein. The inner edges of the reflectors are chamfered to improve ease of assembly and decrease chipping of the edges during assembly. An adhesive can be applied at junctions between the reflectors on their outer surfaces. This construction eliminates or retards light leakage and adhesive leakage.

21 Claims, 16 Drawing Sheets

(51) Int. Cl.
*F21V 13/08* (2006.01)
*F21V 9/30* (2018.01)
*F21V 8/00* (2006.01)

(52) U.S. Cl.
CPC ............ *F21V 13/08* (2013.01); *G02B 6/0096* (2013.01); *G03B 21/204* (2013.01); *G03B 21/208* (2013.01)

(56) References Cited

U.S. PATENT DOCUMENTS

| | | | | |
|---|---|---|---|---|
| 2008/0118215 | A1* | 5/2008 | Chen | G02B 6/0096 385/133 |
| 2014/0016219 | A1* | 1/2014 | Lai | G03B 21/208 359/850 |
| 2017/0031093 | A1 | 2/2017 | Wu | |

FOREIGN PATENT DOCUMENTS

| | | | |
|---|---|---|---|
| CN | 1851553 | | 10/2006 |
| CN | 101051173 | | 10/2007 |
| CN | 106918865 | | 7/2017 |
| JP | 2007187812 | A * | 7/2007 |
| TW | 200832046 | A * | 8/2008 |

* cited by examiner

LIGHT TUNNELS AND METHODS FOR MAKING SAME

This is a 371 of PCT Patent Application Serial No. PCT/CN2017/100164 filed Sep. 1, 2017, the contents of which are fully incorporated herein by reference.

BACKGROUND

The present disclosure relates to projection systems and lighting systems (e.g., automotive lighting systems). In particular, the present disclosure relates to light tunnels/funnels for use in these systems, methods for forming a light tunnel/funnel, and apparatuses that include a light tunnel/funnel and a housing for supporting, protecting, and positioning the light tunnel/funnel.

At present, conventional light tunnels are difficult to assemble. In particular, it is often difficult to pick and place the optical elements (e.g., reflectors) and to control the assembly gap between the optical elements. This often leads to undesirable adhesive leakage into the inside of the light tunnel. Further, the adhesive length of these conventional structures is often too short to provide adequate bonding force between the optical elements, thus negatively affecting the operability of the light tunnel and shortening the life of the light tunnel.

BRIEF DESCRIPTION

The present disclosure thus relates to light tunnels or light funnels, methods for forming a light tunnel or light funnel, and apparatuses that include a light tunnel or light funnel and a housing for supporting, protecting, and positioning the light tunnel or light funnels. The light tunnels or light funnels are constructed from reflectors that are placed so adhesive cannot leak into the interior of the light tunnel/funnel, and light leakage cannot occur. Inner edges of some of the reflectors are chamfered, to avoid chipping of the edges during assembly. They are also much more robust than conventional structures.

Disclosed in some embodiments are light tunnels comprising: (i) a first reflector having a primary face and an opposite secondary face, the primary face of the first reflector being divided into an inner face located between a first notch and a second notch, a first primary side face, and a second primary side face; (ii) a second reflector opposite the first reflector, the second reflector having a primary face and an opposite secondary face, the primary face of the second reflector being divided into an inner face located between a first notch and a second notch, a first primary side face, and a second primary side face; (iii) a third reflector having an inner face, an opposite outer face, an upper end, and an opposite lower end, the upper end of the third reflector cooperatively engaging the first notch of the first reflector, and the lower end of the third reflector cooperatively engaging the first notch of the second reflector, such that the third reflector connects the first and second reflectors; (iv) a fourth reflector opposite the third reflector, the fourth reflector having an inner face, an opposite outer face, an upper end, and an opposite lower end, the upper end of the fourth reflector cooperatively engaging the second notch of the first reflector, and the lower end of the fourth reflector cooperatively engaging the second notch of the second reflector, such that the fourth reflector connects the first and second reflectors; and (v) an adhesive applied to at least one junction between (A) the first or second primary side face of either the first reflector or the second reflector; and (B) the outer face of the third reflector or the fourth reflector. At least the inner edges of the third and fourth reflectors are chamfered, and sometimes their outer edges are chamfered as well.

In particular embodiments, the first and second notches of the first reflector have three sides, and the first and second notches of the second reflector have three sides.

The first and second reflectors may each be defined by a main body portion and opposing first and second side body portions extending outwardly away from the main body portion beyond the first and notches respectively. Sometimes, the main body portion of each of the first and second reflectors has a thickness that is substantially equal to a thickness of the first body portion and a thickness of the second side body portion. In other instances, the main body portion of each of the first and second reflectors has a thickness that is greater than both a thickness of the first body portion and a thickness of the second side body portion. In some embodiments, in both the first reflector and the second reflector, the first side body portion has a width that is greater than or equal to one-half a width of the first notch.

The inner faces of the first, second, third, and fourth reflectors may each have a substantially rectangular profile, such that the light tunnel has a substantially constant cross-sectional area from a first end of the light tunnel to a second end thereof.

In particular embodiments, the first reflector and the second reflector each have a width of greater than or equal to 3 millimeters.

The inner faces of each of the first, second, third, and fourth reflectors can be coated with a reflective film. The secondary and outer faces of the first, second, third, and fourth reflectors may be uncoated.

In specific embodiments, adhesive is applied to: (i) a first junction between the first primary side face of the first reflector and the outer face of the third reflector; (ii) a second junction between the first primary side face of the second reflector and the outer face of the third reflector; (iii) a third junction between the second primary side face of the first reflector and the outer face of the fourth reflector; and (iv) a fourth junction between the side primary side face of the second reflector and the outer face of the fourth reflector.

Also disclosed are apparatuses comprising (a) a light tunnel as described above; and (b) a housing that substantially encloses the light tunnel. The housing may include a spring plate configured to fix the relative position of the light tunnel and the housing. The housing may be capable of withstanding temperatures of at least 300° C. No adhesive needs to be present between the housing and the light tunnel.

Disclosed in some embodiments are light funnels comprising: (i) a first reflector having a primary face and an opposite secondary face, the primary face of the first reflector being divided into an inner face located between a first notch and a second notch, a first primary side face, and a second primary side face; (ii) a second reflector opposite the first reflector, the second reflector having a primary face and an opposite secondary face, the primary face of the second reflector being divided into an inner face located between a first notch and a second notch, a first primary side face, and a second primary side face; (iii) a third reflector having an inner face, an opposite outer face, an upper end, and an opposite lower end, the upper end of the third reflector cooperatively engaging the first notch of the first reflector, and the lower end of the third reflector cooperatively engaging the first notch of the second reflector, such that the third reflector connects the first and second reflectors; (iv) a fourth reflector opposite the third reflector, the fourth reflector having an inner face, an opposite outer face, an upper end, and an opposite lower end, the upper end of the fourth reflector cooperatively engaging the second notch of the first reflector, and the lower end of the fourth reflector cooperatively engaging the second notch of the second reflector, such that the fourth reflector connects the first and second reflectors; and (v) an adhesive applied to at least one junction between (A) the first or second primary side face of either the first reflector or the second reflector; and (B) the outer face of the third reflector or the fourth reflector. Either (A) the inner faces of the first and second reflectors each have a substantially rectangular profile, and the inner faces of the third and fourth reflectors each have a substantially trapezoidal profile; or (B) the inner faces of the first and second reflectors can each have a substantially trapezoidal profile, and the inner faces of the third and fourth reflectors each have a substantially rectangular profile. As a result of these shapes, the light funnel has a cross-sectional area that decreases from a first end of the light funnel to a second end thereof. The inner and outer edges of the reflectors used to make the light funnel do not need to be chamfered, but can be so chamfered in some embodiments.

Also disclosed are methods for forming a light tunnel, comprising: forming first and second notches in a primary face of a first reflector having a primary face and an opposite secondary face, the primary face of the first reflector being divided into an inner face located between the first notch and the second notch, a first primary side face, and a second primary side face; forming first and second notches in a primary face of a second reflector having a primary face and an opposite secondary face, the primary face of the second reflector being divided into an inner face located between the first notch and the second notch, a first primary side face, and a second primary side face; engaging an upper end of a third reflector with the first notch of the first reflector, the upper end having at least one chamfer; engaging a lower end of the third reflector with the first notch of the second reflector, the lower end having at least one chamfer; engaging an upper end of a fourth reflector with the second notch of the first reflector, the upper end having at least one chamfer; engaging a lower end of the fourth reflector with the second notch of the second reflector, the lower end having at least one chamfer; and applying an adhesive to at least one junction between (A) the first or second primary side face of either the first reflector or the second reflector; and (B) the outer face of the third reflector or the fourth reflector.

The first and second notches in the primary faces of the first and second reflectors can be formed by a process selected from the group consisting of sawing, dicing, milling, and laser cutting.

Also disclosed are apparatuses, comprising: (a) a light funnel as described above; and (b) a housing substantially enclosing the light funnel, the housing including a spring plate configured to fix the relative position of the light funnel and the housing. In these embodiments, the spring plate may also include lips extending downwards from edges thereof.

The housing may be capable of withstanding temperatures of at least 300° C. No adhesive needs to be present between the housing and the light funnel.

Also disclosed are methods for collimating light, comprising passing the light through a light tunnel or a light funnel as described above.

Further disclosed are projection systems, comprising: a light source configured to produce excitation light; a wavelength conversion material that absorbs the excitation light and generates emission light; and the light tunnel or light funnel described herein, which is used to homogenize the emission light. Other components of the projection systems can include: a lens configured to converge the collimated and homogenized light; an image generation device configured to reflect the converged light; and a projecting unit for outputting the converged light.

Also disclosed herein in various embodiments are lighting systems, comprising: a phosphor material that receives excitation light and emits light having a first wavelength distribution; and the light tunnel or light funnel described herein, which is used to adjust the emitted light to a second wavelength distribution different than the first wavelength distribution.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
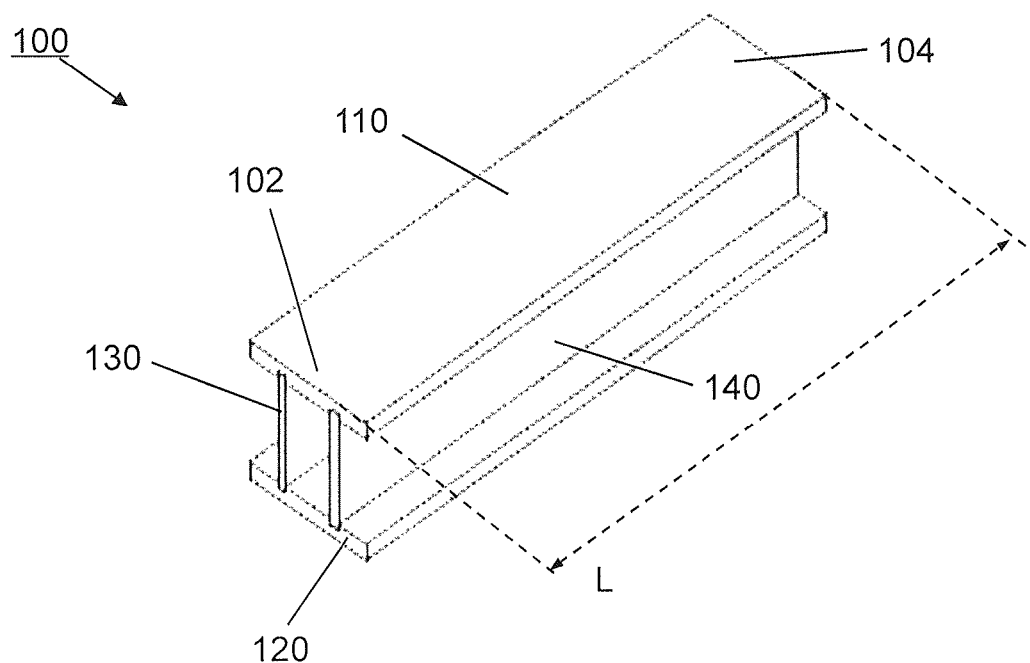
FIG. 1A is a perspective view of a first exemplary light tunnel according to the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, along with any unavoidable impurities that might result therefrom, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

The term "light tunnel" is used herein to refer to a structure used to guide and/or collimate light (e.g., light rods, integration rods, light pipes, rod lenses).

The term "chamfer" is used herein to refer to a transitional surface between two faces of a reflector. The term should not be construed to refer to any particular shape. In the present disclosure, the chamfer may be rounded.

The present disclosure relates to light tunnels and light funnels, methods for forming a light tunnel or light funnel, and apparatuses that include (A) a light tunnel or a light funnel and (B) a housing for supporting, protecting, and positioning the light tunnel or light funnel.

Figure 10A:
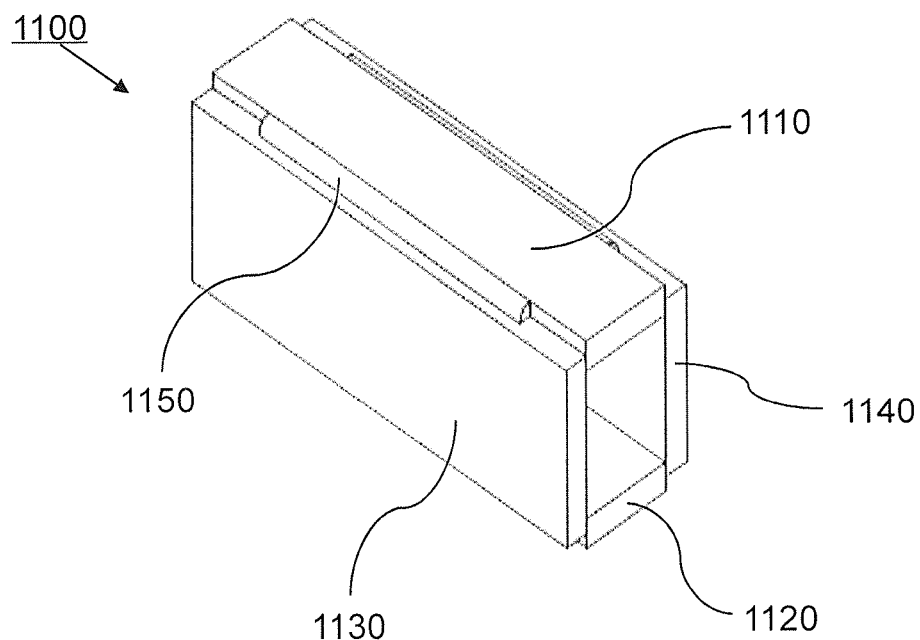
FIG. 10A is a perspective view of a conventional light tunnel.
Figure 10B:
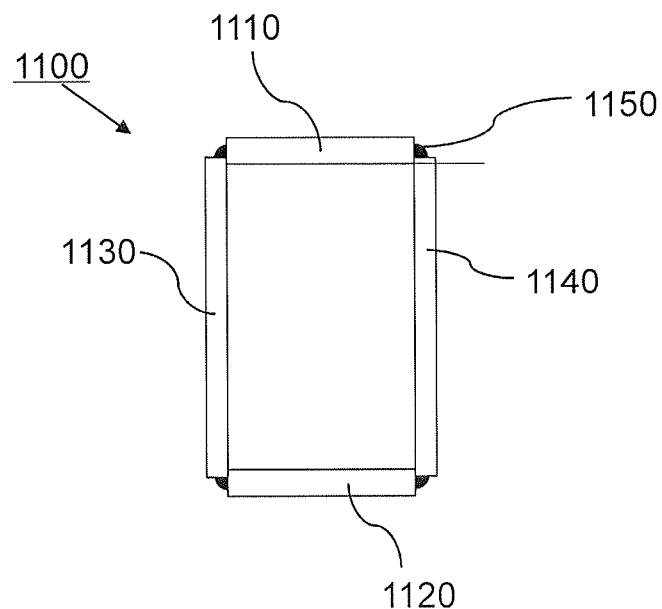
FIG. 10B is a front view of the conventional light tunnel of FIG. 10A.

A conventional light tunnel design is shown in FIG. 10A and FIG. 10B. FIG. 10A is a perspective view of a conventional light tunnel 1100, and FIG. 10B is a front view of the conventional light tunnel 1100. The conventional light tunnel 1100 includes four rectangular reflectors 1110, 1120, 1130, 1140 arranged to form a hollow cuboid construction. In particular, the first reflector 1110 and the second reflector 1120 are positioned parallel to one another and form opposite sides of the tunnel, while the third reflector 1130 and the fourth reflector 1140 are similarly positioned parallel to one another and forming opposite sides of the tunnel. As seen, the first and second reflectors 1110, 1120 run perpendicular to the third and fourth reflectors 1130, 1140. The third reflector 1130 overlaps a portion of an edge of the first reflector 1110 to form a juncture therebetween, and an adhesive 1150 is applied to this juncture. The third reflector 1130 also overlaps a portion of an edge of the second reflector 1120 to form a juncture therebetween. The fourth reflector 1140 overlaps a portion of an edge of the first reflector 1110 to form a juncture therebetween, this juncture being on an opposite side of the first reflector 1110 from the third reflector 1130. The fourth reflector 1140 also overlaps a portion of an edge of the second reflector 1120 to form a juncture therebetween, this juncture being on an opposite side of the second reflector 1120 from the third reflector 1130. In this way, the third and fourth reflectors 1130, 1140 connect the first and second reflectors 1110, 1120 along opposite sides thereof, the connection occurring by way of adhesive at the junctures. In particular, adhesive is placed on all of the junctures.

Figure 11A:
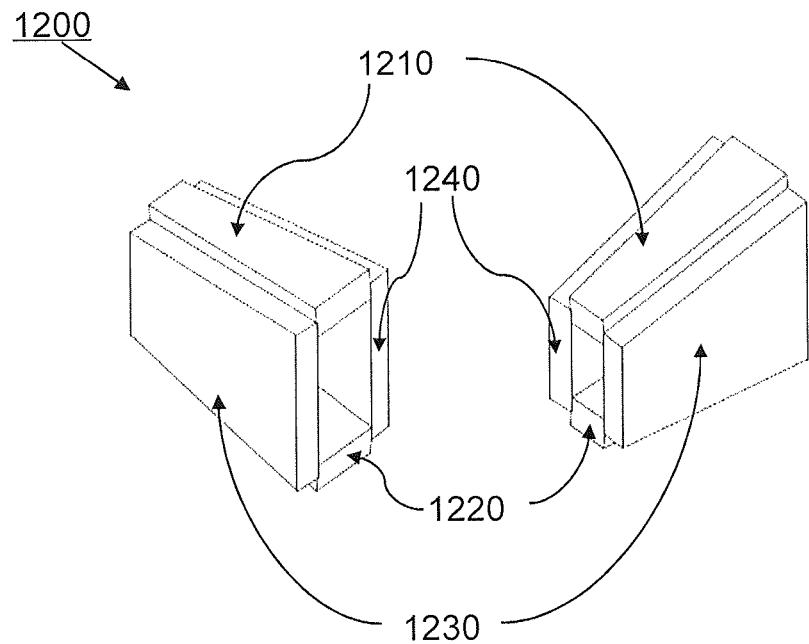
FIG. 11A shows two perspective views of a conventional light funnel.
Figure 11B:
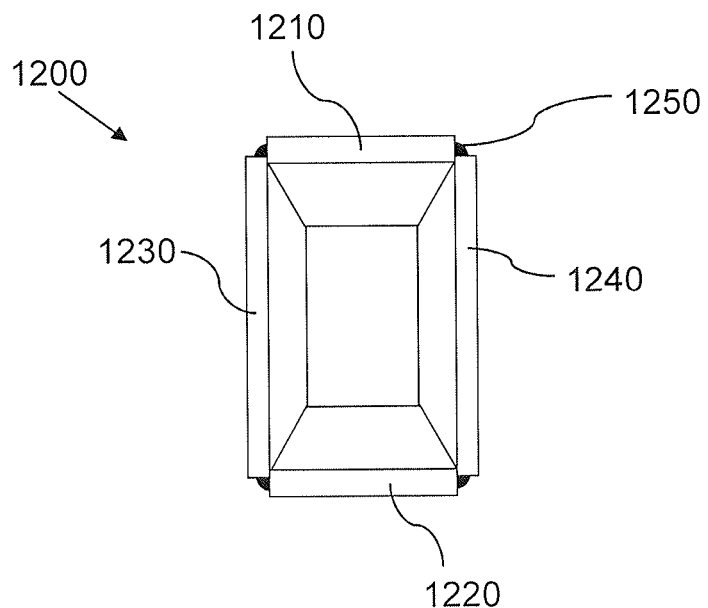
FIG. 11B is a front view of the conventional light funnel of FIG. 11A.

A conventional light funnel design is shown in FIG. 11A and FIG. 11B. FIG. 11A shows a perspective view of a conventional light funnel 1200, and FIG. 11B is a front view of the conventional light funnel 1200. The conventional light funnel 1200 includes four trapezoidal reflectors 1210, 1220, 1230, 1240 arranged to form a hollow trapezoidal prism construction. In particular, the first reflector 1210 and the second reflector 1220 are positioned opposite one another and taper toward one another, while the third reflector 1230 and the fourth reflector 1240 are similarly positioned opposite another and also taper toward one another. As seen, the first and second reflectors 1210, 1220 run perpendicular to the third and fourth reflectors 1230, 1240. As with conventional light tunnel 1100 of FIG. 10A and FIG. 10B, in conventional light funnel 1200, the third reflector 1230 overlaps a portion of an edge of the first reflector 1210 to form a juncture therebetween, and an adhesive 1250 is applied to this juncture. The third reflector 1230 also overlaps a portion of an edge of the second reflector 1220 to form a juncture therebetween. The fourth reflector 1240 overlaps a portion of an edge of the first reflector 1210 to form a juncture therebetween, this juncture being on an opposite side of the first reflector 1110 from the third reflector 1230. The fourth reflector 1240 also overlaps a portion of an edge of the second reflector 1220 to form a juncture therebetween, this juncture being on an opposite side of the second reflector 1220 from the third reflector 1230. In this way, the third and fourth reflectors 1230, 1240 again connect the first and second reflectors 1210, 1220 along opposite sides thereof, the connection occurring by way of adhesive at the junctures. In particular, the adhesive adheres between adjacent exposed side surfaces of the reflectors. Whereas the cross-sectional area of the light tunnel shown in FIG. 1B remains substantially constant, the cross-sectional area of the light funnel seen here decreases from one end of the light funnel to the other end (best seen in FIG. 2B). The structure of the light tunnels (i.e., substantially constant cross-sectional area) and the structure of the light funnels (i.e., decreasing cross-sectional area) of the present disclosure are defined by the inner faces of the reflectors of the light tunnels and light funnels. Put another way, the inner faces of the reflectors of the light tunnels of the present disclosure remain substantially equidistant from one another along the length of the light tunnel, while the inner faces of the reflectors of the light funnels of the present disclosure taper toward one another along the length of the light funnel. That is, while the light tunnels and light funnels of the present disclosure are illustrated as having reflectors of substantially constant thickness, it is to be understood that the reflectors could be of varying thickness, with the inner faces thereof still angled as desired to create a light funnel or light tunnel.

Figure 1B:
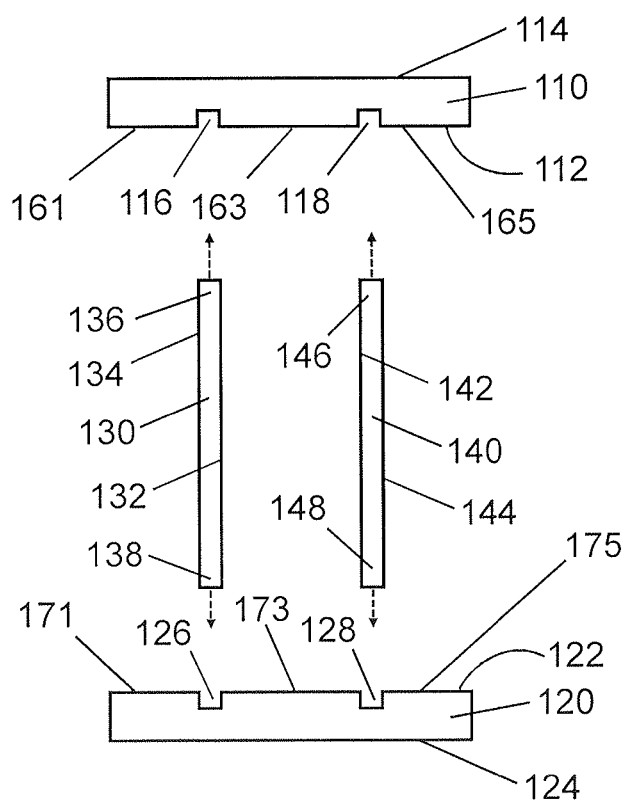
FIG. 1B is an exploded front view of the first exemplary light tunnel of FIG. 1A.
Figure 1C:
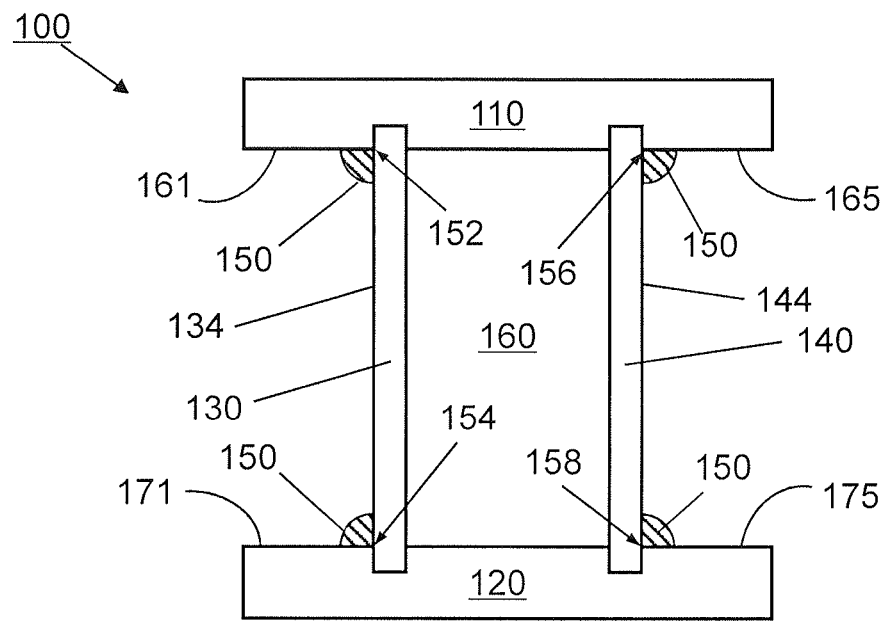
FIG. 1C is an assembled front view of the first exemplary light tunnel of FIG. 1A.
Figure 1D:
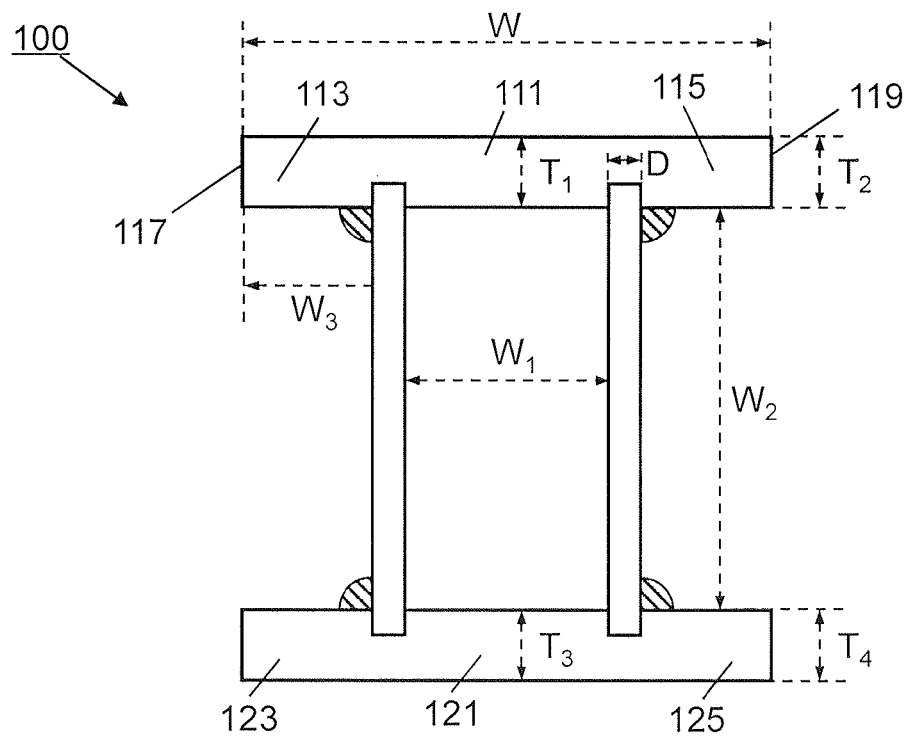
FIG. 1D is another assembled front view of the first exemplary light tunnel of FIG. 1A showing additional features thereof.
Figure 1E:
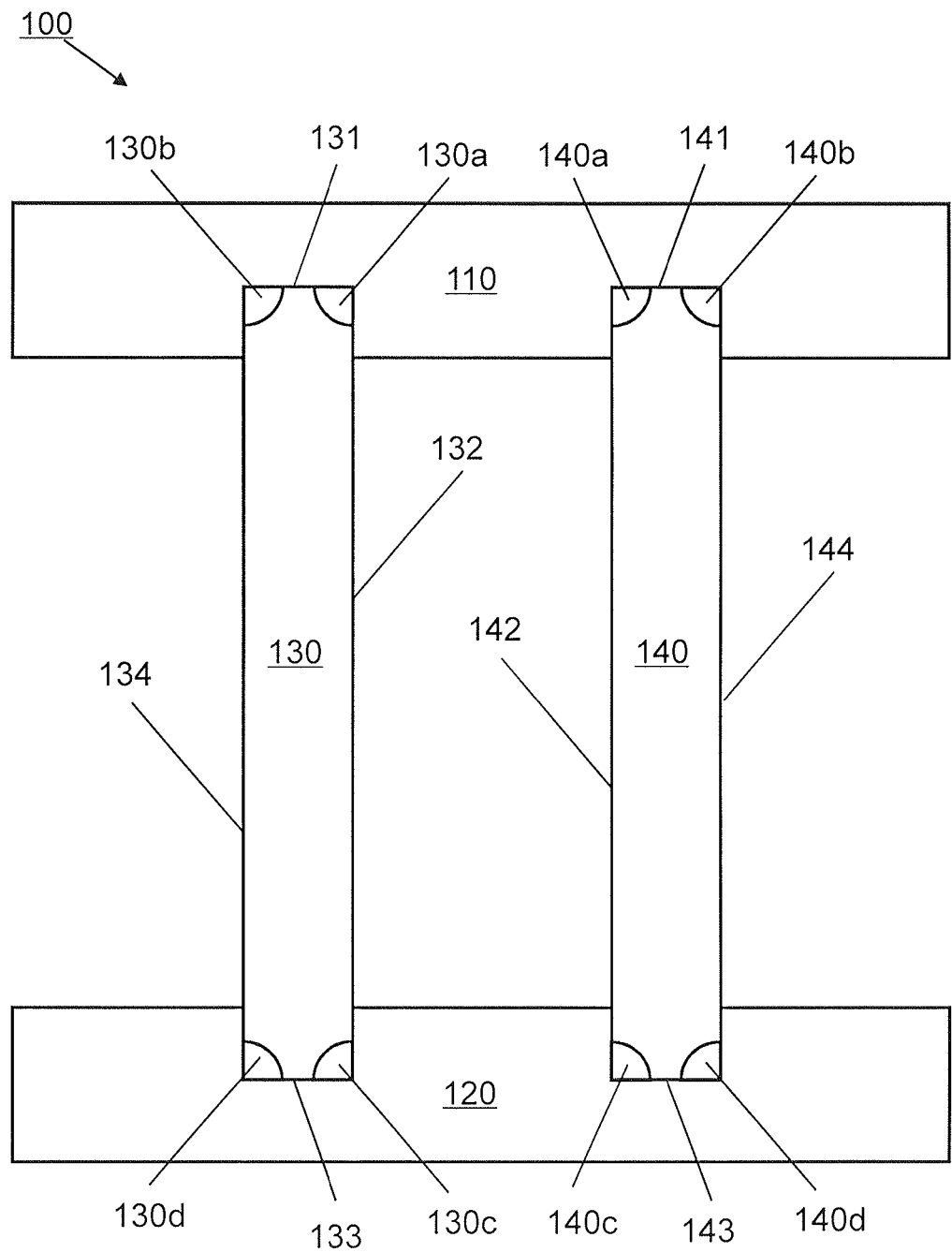
FIG. 1E is a magnified front view of the first exemplary light tunnel of FIG. 1A showing the chamfers.

FIGS. 1A-1E show a first exemplary light tunnel according to the present disclosure. FIG. 1A is a perspective view of the first exemplary light tunnel, FIG. 1B is an exploded front view of the first exemplary light tunnel, FIG. 1C is an assembled front view of the first exemplary light tunnel, and FIG. 1D is another assembled front view of the first exemplary light tunnel. FIG. 1E is a magnified front view. The first exemplary light tunnel 100 includes a total of four reflectors, each having a substantially rectangular profile. As seen in FIG. 1A, the four reflectors in this exemplary embodiment all have the same length L from one end of the light tunnel 102 to the other opposite end 104.

A first reflector 110 is positioned opposite a second reflector 120. In this exemplary embodiment, the first reflector 110 is substantially parallel to the second reflector 120 from the first end 102 to the second end 104. As can be best seen in FIG. 1B, the first reflector 110 has a primary face 112 and an opposite secondary face 114. The second reflector 120 has a primary face 122 and an opposite secondary face 124. The primary face 112 of the first reflector 110 faces the primary face 122 of the second reflector 120. The primary face 112 of the first reflector 110 includes a first notch 116 and a second notch 118. The primary face 122 of the second reflector 120 includes a first notch 126 and a second notch 128. The first notch 116 of the first reflector is aligned with the first notch 126 of the second reflector. The second notch 118 of the first reflector is aligned with the second notch 128 of the second reflector.

The primary face 112 of the first reflector 110 is divided by the first notch 116 and the second notch 118 into three parts. The first part is an inner face 163, which is located between the two notches 116, 118. The second part is a first primary side face 161, which extends from the first notch 116 to the side of the first reflector. The third part is a second primary side face 165, which extends from the second notch 118 to the other side of the first reflector.

Similarly, the primary face 122 of the second reflector 120 is divided by the first notch 126 and the second notch 128 into three parts. The first part is an inner face 173, which is located between the two notches 126, 128. The second part is a first primary side face 171, which extends from the first notch 126 to the side of the second reflector. The third part is a second primary side face 175, which extends from the second notch 128 to the other side of the second reflector.

The first and second notches 116, 118 of the first reflector 110 and the first and second notches 126, 128 of the second reflector 120 are shaped as grooves in the primary faces 112, 122 of the first and second reflectors 110, 120, respectively. More particularly, as seen in FIG. 1B, the first and second notches 116, 118 of the first reflector 110 and the first and second notches 126, 128 of the second reflector 120 are defined by three distinct edges, a base edge and two side edges extending substantially perpendicular to the base edge (though shown as edges here, they are actually faces). In this way, the notches act as seats with which the third and fourth reflectors 130, 140 can cooperatively engage by direct insertion therein.

A third reflector 130 is positioned opposite a fourth reflector 140. In this exemplary embodiment, the third reflector 130 is substantially parallel to the fourth reflector 140 from the first end 102 to the second end 104. As can be best seen in FIG. 1B, the third reflector has an inner face 132 and an opposite outer face 134, and the fourth reflector has an inner face 142 and an opposite outer face 144. The inner face 132 of the third reflector 130 faces the inner face 142 of the fourth reflector 140.

As best seen in FIG. 1B, an upper end 136 of the third reflector 130 is positioned so as to cooperatively engage with the first notch 116 of the primary face 112 of the first reflector 110, as shown by the arrow extending from the upper end 136 of the third reflector 130. A lower end 138 of the third reflector 130 is positioned so as to cooperatively engage with the first notch 126 of the primary face 122 of the second reflector 120, as shown by the arrow extending from the lower end 138 of the third reflector 130. In this way, the third reflector 130 connects the first reflector 110 and the second reflector 120 through cooperative engagement with the first notches 116, 126 thereof. Similarly, an upper end 146 of the fourth reflector 140 is positioned so as to cooperatively engage with the second notch 118 of the primary face 112 of the first reflector 110, as shown by the arrow extending from the upper end 146 of the fourth reflector 140, and a lower end 148 of the fourth reflector 140 is positioned so as to cooperatively engage with the second notch 128 of the primary face 122 of the second reflector 120, as shown by the arrow extending from the lower end 148 of the fourth reflector 140. In this way, the fourth reflector 140 connects the first reflector 110 and the second reflector 120 through cooperative engagement with the second notches 118, 128 thereof.

The four reflectors are assembled together as described above and shown in FIG. 1C to form the first exemplary light tunnel 100. In this way, the inner faces 163, 173, 132, 142 of the first, second, third, and fourth reflectors 110, 120, 130, 140 collectively form a light passage 160 therebetween. Generally, so as to aid in light passage and/or collimation, the inner faces 112, 122, 132, 142 of the first, second, third, and fourth reflectors 110, 120, 130, 140 are coated with a reflective film. The reflective coating, for example, can have a high reflectivity (e.g., 98% or greater at the 360-800 nanometer wavelength range, as measured by a spectrophotometer).$_{[MSE1]}$ The reflecting coating can be made of a metal material, such as silver, aluminum, gold, or combinations thereof, or other materials such as silicon dioxide ($SiO_2$), niobium pentoxide ($Nb_2O_5$), or titanium oxide ($Ti_2O_3$). In contrast, the secondary and outer faces 114, 124, 134, 144 of the first, second, third, and fourth reflectors 110, 120, 130, 140 are generally uncoated.

Referring back to FIG. 1A, the inner faces 163, 173 of the first and second reflectors 110, 120 are substantially parallel to one another from the first end 102 to the opposite second end 104 of the light tunnel 100. Similarly, the inner faces 132, 142 of the third and fourth reflectors 130, 140 are substantially parallel to one another from the first end 102 to the second end 102 of the light tunnel. In this way, the light passage 160 formed between the inner faces 163, 173, 132, 142 of the first, second, third, and fourth reflectors 310, 120, 130, 140 is of substantially constant cross-sectional area from the first end 102 of the light tunnel 100 to the second end 104 thereof.

In particular embodiments, it may be desirable to apply an adhesive to further adjoin the reflectors to one another. [MSE2] In particular, as shown in FIG. 1C, adhesive can be applied at one or more of (i) a first junction 152 between the first primary side face 161 of the first reflector 110 and the outer face 134 of the third reflector 130; (ii) a second junction 154 between the first primary side face 171 of the second reflector 120 and the outer face 134 of the third reflector 130; (iii) a third junction 156 between the second primary side face 165 of the first reflector 110 and the outer face 144 of the fourth reflector 140; and (iv) a fourth junction 158 between the second primary side face 175 of the second reflector 120 and the outer face 144 of the fourth reflector 140. In this way, the junctures are configured to receive an adhesive (e.g., in the form of a bead) for bonding together two adjacent reflectors. The adhesive can be, for example, a UV-curable adhesive, an epoxy adhesive, a heat-resisting ceramic adhesive, or another bonding material. Desirably, the adhesive is capable of withstanding temperatures of at least 300° C. and greater and has a bonding strength greater than 50 psi. Further, the adhesive is desirably moisture-proof, and is resistant to leakage and outgassing.

Turning now to FIG. 1D, it can be seen that the first reflector 110 is defined by a main body portion 111, a first side body portion 113, and a second side body portion 115. The first and second side body portions 113, 115 extend outwardly away from the main body portion 111 in opposing directions. Generally, as seen in FIG. 1D, the first side body portion 113 is separated from the main body portion 111 by the first notch 116 of the first reflector 110, and the second side body portion 115 is separated from the main body portion 111 by the second notch 118 of the first reflector 110. Referring to FIG. 1B and FIG. 1D together, the first primary side face 161 is on the first side body portion 113, the inner face 163 is on the main body portion 111, and the second primary side face 165 is on the second side body portion 115.

As seen in FIG. 1D, the main body portion 111 has a thickness $T_1$ and the first and second side body portions 113, 115 each have a thickness $T_2$. In this exemplary embodiment, $T_1$ is equal to or substantially equal to $T_2$ (i.e., the main body portion 111 has a thickness that is equal to or substantially equal to the thickness of the first and second side body portions 113, 115), such that the first reflector 110 has a constant or substantially constant thickness.

Similarly, as seen in FIG. 1D, the second reflector 120 is defined by a main body portion 121, a first side body portion 123, and a second side body portion 125. The first and second side body portions 123, 125 extend outwardly away from the main body portion 121 in opposing directions. Generally, as seen in FIG. 1D, the first side body portion 123 is separated from the main body portion 121 by the first notch 126 of the second reflector 120, and the second side body portion 125 is separated from the main body portion 121 by the second notch 128 of the second reflector 120. Referring to FIG. 1B and FIG. 1D together, the first primary side face 171 is on the first side body portion 123, the inner face 173 is on the main body portion 121, and the second primary side face 175 is on the second side body portion 125.

As seen in FIG. 1D, the main body portion 121 has a thickness $T_3$ and the first and second side body portions 123, 125 each have a thickness $T_4$. The thickness is measured between the primary and secondary faces of the first and second reflectors 110, 120, or between the inner and outer faces on the third and fourth reflectors 130, 140. In this exemplary embodiment, $T_3$ is equal to or substantially equal to $T_4$ (i.e., the main body portion 121 has a thickness that is equal to or substantially equal to the thickness of the first and second side body portions 123, 125), such that the second reflector 120 has a constant or substantially constant thickness.

With continued reference to FIG. 1D, the first and second reflectors 110, 120 of the first exemplary light tunnel 100 have a width W. The width is measured in the axis between the distal faces 117, 119. The first and second notches 116, 118 of the first reflector 110 and the first and second notches 126, 128 of the second reflector 120 each have a width D. The distance between the inner faces of the third reflector 130 and the fourth reflector 140 is defined by $W_1$. The distance between the primary faces of the first reflector 110 and the second reflector 120 is defined by $W_2$. The distance from a first distal face 117 of the first reflector 110 to the outer face of the third reflector 130 and the distance from an opposite second distal face 119 of the first reflector 110 to the outer face of the fourth reflector 140 are defined by $W_3$. Most preferably, $W_3$ is at least one-half D, and at least three millimeters, though other dimensions are contemplated within the scope of the present disclosure. It is noted that the ratio of $W_2:W_1$ can vary as desired.

Referring now to FIG. 1E, an upper face 131 and a lower face 133 of the third reflector 130 are labeled. The upper face 131 of the third reflector 130 is on an opposite end of the reflector from the lower face 133 of the third reflector 130. Similarly, an upper face 141 and a lower face 143 of the fourth reflector 140 are also labeled, again with the upper face 141 of the fourth reflector 140 on an opposite end of the reflector from the lower face 143 of the fourth reflector 140. The edges of the third and fourth reflectors 130, 140 bound by the first and second reflectors 110, 120 are chamfered. In other words, the chamfers are located along one or more corners of the reflector(s).

Third reflector 130 includes four chamfers 130*a*, 130*b*, 130*c*, and 130*d*, and fourth reflector 140 also includes four chamfers 140*a*, 140*b*, 140*c*, and 140*d*. More particularly, the first chamfer 130*a* of the third reflector 130 is located between the upper face 131 and the inner face 132 of the third reflector 130; the second chamfer 130*b* of the third reflector 130 is located between the upper face 131 and the outer face 134 of the third reflector 130; the third chamfer 130*c* of the third reflector 130 is located between the lower face 133 and the inner face 132 of the third reflector 130; and the fourth chamfer 130*d* of the third reflector 130 is located between the lower face 133 and the outer face 134 of the third reflector 130.

Similarly, the first chamfer 140*a* of the fourth reflector 140 is located between the upper face 141 and the inner face 142 of the fourth reflector 140; the second chamfer 140*b* of the fourth reflector 140 is located between the upper face 141 and the outer face 144 of the fourth reflector 140; the third chamfer 140*c* of the fourth reflector 140 is located between the lower face 143 and the inner face 142 of the third reflector 140; and the fourth chamfer 140*d* of the fourth reflector 140 is located between the lower face 143 and the outer face 144 of the fourth reflector 140.

These chamfers can also be grouped as upper chamfers 130*a*, 130*b*, 140*a*, 140*b*; or as lower chamfers 130*c*, 130*d*, 140c, 140d; or as inner chamfers 130a, 140a, 130c, 140c; or as outer chamfers 130b, 140b, 130d, 140d. The chamfers aid in assembly of the light tunnel 100 by providing a smoother, indented surface that eases insertion into one of the notches of an adjacent reflector. Moreover, when the reflectors are made of a brittle material (e.g., mirrored glass), the chamfers advantageously avoid chipping of the edges of the reflector(s). It is to be understood that any one or more of the reflectors without notches (i.e., either or both of the third and fourth reflectors) can include chamfered edges or corners, with as many chamfers as is desired. It is also noted that the chamfers are illustrated here as having a rounded shape, but other shapes can also be used.

Figure 2A:
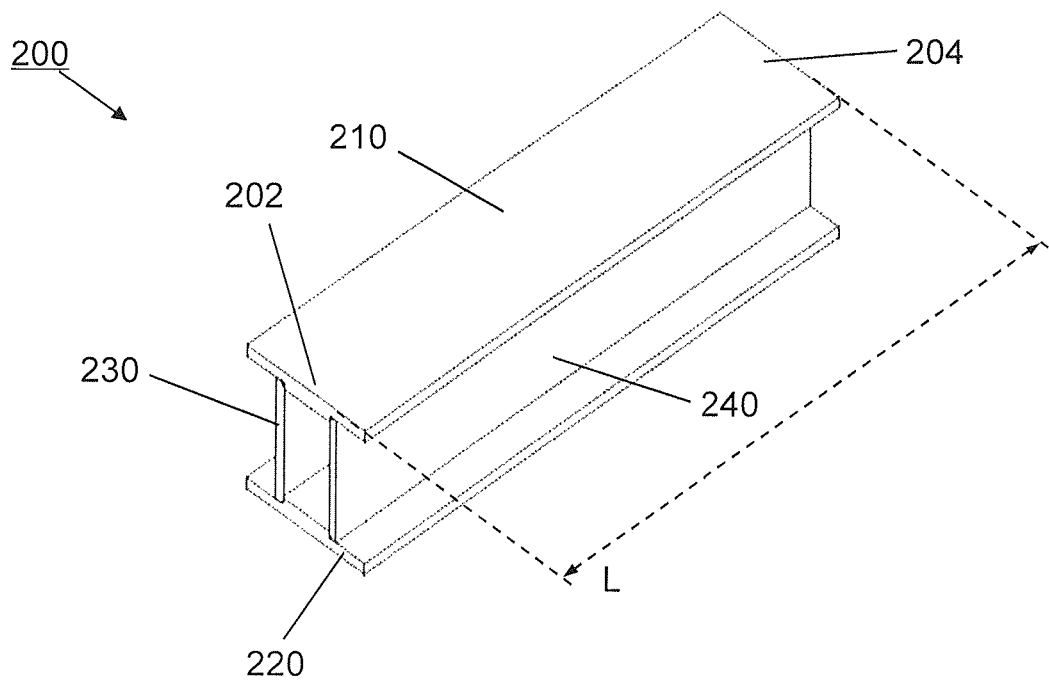
FIG. 2A is a perspective view of a second exemplary light tunnel according to the present disclosure.
Figure 2B:
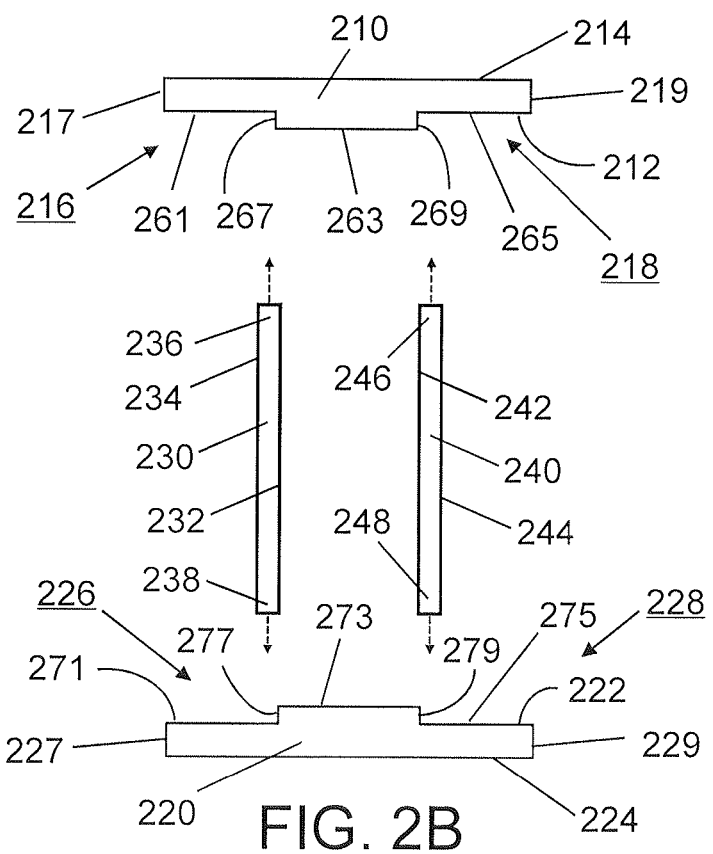
FIG. 2B is an exploded front view of the second exemplary light tunnel of FIG. 2A.
Figure 2C:
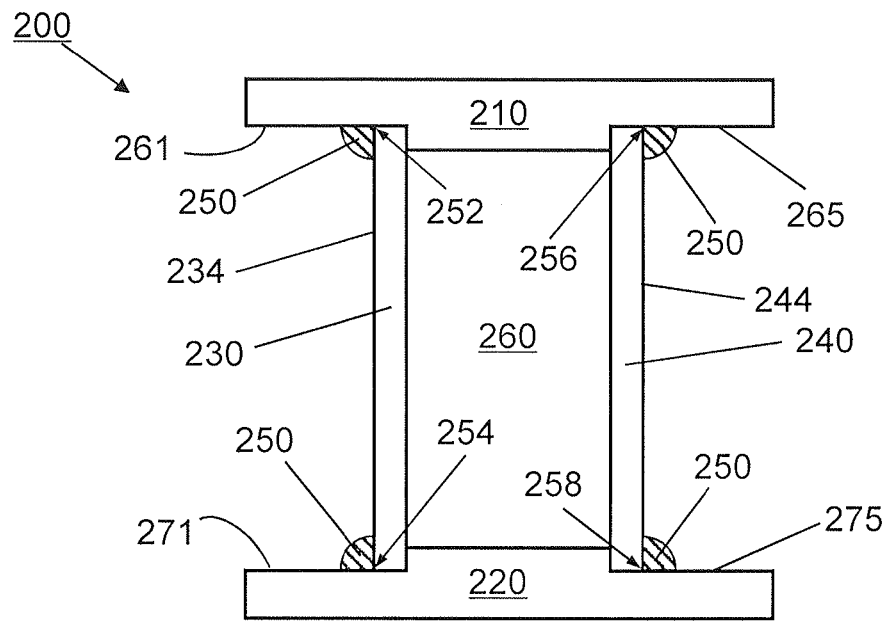
FIG. 2C is an assembled front view of the second exemplary light tunnel of FIG. 2A.
Figure 2D:
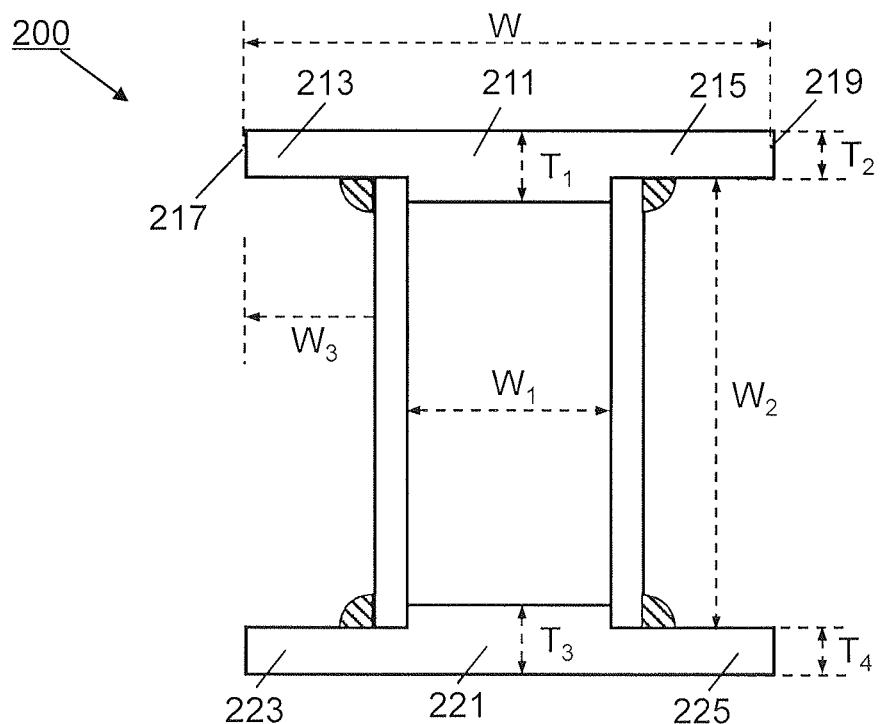
FIG. 2D is another assembled front view of the second exemplary light tunnel of FIG. 2A showing additional features thereof.
Figure 2E:
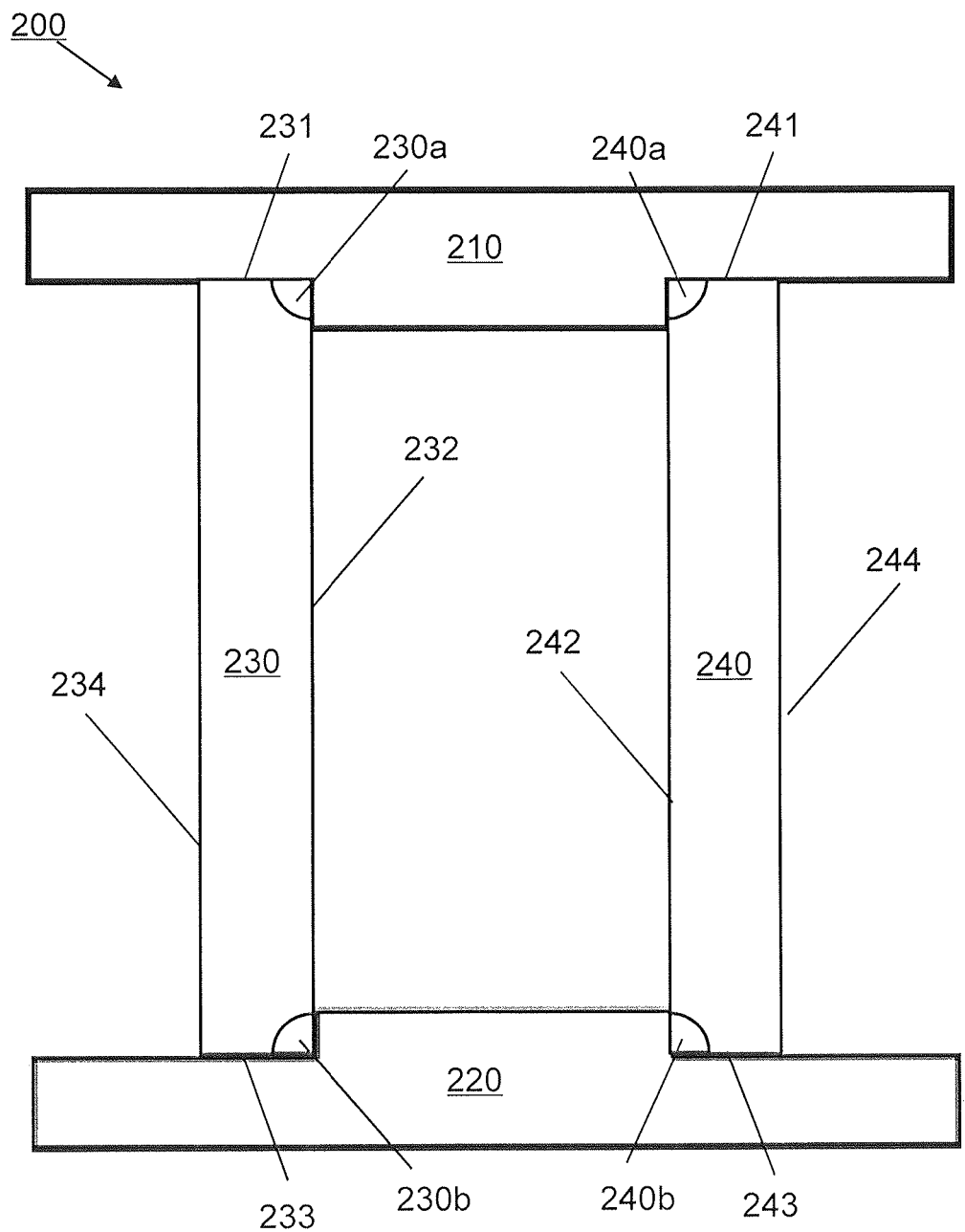
FIG. 2E is a magnified front view of the second exemplary light tunnel of FIG. 2A showing the chamfers.

FIGS. 2A-2E show a second exemplary light tunnel according to the present disclosure. FIG. 2A is a perspective view of the second exemplary light tunnel, FIG. 2B is an exploded front view of the second exemplary light tunnel, FIG. 2C is an assembled front view of the second exemplary light tunnel, and FIG. 2D is another assembled front view of the second exemplary light tunnel. FIG. 2E is a magnified front view. The second exemplary light tunnel 200 is similar in many respects to the first exemplary light tunnel 100 shown in FIGS. 2A-4D. Thus, for sake of brevity, many similar characteristics between the first exemplary light tunnel 100 and the second exemplary light tunnel 200 will not be described again.

Referring first to FIG. 2A, the second exemplary light tunnel 200 includes two sets of symmetrical reflectors: first reflector 210 and second reflector 220 are symmetrical with one another, and third reflector 230 and fourth reflector 240 are symmetrical with one another. The first end 202 and the second end 204 of the light tunnel 200 are also indicated.

Turning now to FIG. 2B, the first reflector 210 includes a primary face 212 and a secondary face 214 which are substantially parallel to each other. The primary face 212 includes a first notch 216 and a second notch 218. The first and second notches 216, 218 of the first reflector 210 divide the primary face 212 into an inner face 263, a first primary side face 261, and a second primary side face 265. The first distal face 217 and the second distal face 219 of the first reflector are also shown. Here, the notches only have two faces, not three faces as in FIG. 1B. The inner face 263 is in the form of a step, with vertical walls 267, 269. One face of the first notch 216 is the first primary side face 261, which extends from the inner face 263 to the first distal face 217. The other face of the first notch 216 is the vertical wall 267. Similarly, one face of the second notch 218 is the second primary side face 265, which extends from the inner face 263 to the second distal face 219. The other face of the second notch 216 is the vertical wall 269.

Similarly, the second reflector 220 includes a primary face 222 and a secondary face 224 which are substantially parallel to each other. The primary face 222 includes a first notch 226 and a second notch 228. The first and second notches 226, 228 of the second reflector 220 divide the primary face 222 into an inner face 273, a first primary side face 271, and a second primary side face 275. The first distal face 227 and the second distal face 229 of the second reflector are also shown. Here, the notches only have two sides, not three, such that the inner face 273 is in the form of a step, with vertical walls 277, 279. One side of the first notch 226 is the first primary side face 271, which extends from the inner face 273 to the first distal face 227. The other side of the first notch 226 is the vertical wall 277. Similarly, one side of the second notch 228 is the second primary side face 275, which extends from the inner face 273 to the second distal face 229. The other side of the second notch 226 is the vertical wall 279.

In the second exemplary light tunnel 200, the third reflector 230 connects the first reflector 210 and the second reflector 220 through cooperative engagement with the first notches 216, 226 thereof, with the upper end 236 and lower end 238 abutting the vertical walls 267, 277. Similarly, the fourth reflector 240 connects the first reflector 210 and the second reflector 220 through cooperative engagement with the second notches 218, 228 thereof, with the upper end 246 and lower end 248 abutting the vertical walls 269, 279.

As shown in FIG. 2C, adhesive can be applied at one or more of (i) a first junction 252 between the first primary side face 261 of the first reflector 210 and the outer face 234 of the third reflector 230; (ii) a second junction 254 between the first primary side face 271 of the second reflector 220 and the outer face 234 of the third reflector 230; (iii) a third junction 256 between the second primary side face 265 of the first reflector 210 and the outer face 244 of the fourth reflector 240; and (iv) a fourth junction 258 between the second primary side face 275 of the second reflector 220 and the outer face 244 of the fourth reflector 240.

Turning now to FIG. 2D, the first reflector 210 is defined by a main body portion 211, a first side body portion 213, and a second side body portion 215. The first and second side body portions 213, 215 extend outwardly away from the main body portion 211 in opposing directions. Referring to FIG. 2B and FIG. 2D together, the first primary side face 261 is on the first side body portion 213, the inner face 263 is on the main body portion 211, and the second primary side face 265 is on the second side body portion 215.

Similarly, in FIG. 2D the second reflector 220 is defined by a main body portion 221, a first side body portion 223, and a second side body portion 225. The first and second side body portions 223, 225 extend outwardly away from the main body portion 221 in opposing directions. Referring to FIG. 2B and FIG. 2D together, the first primary side face 271 is on the first side body portion 223, the inner face 273 is on the main body portion 221, and the second primary side face 275 is on the second side body portion 225.

As seen in FIG. 2D, the main body portion 211 of the first reflector 210 has a thickness $T_1$ and the first and second side body portions 213, 215 each have a thickness $T_2$. In this exemplary embodiment, $T_1$ is greater than $T_2$ (i.e., the main body portion 211 has a thickness that is greater than the thickness of each of the first and second side body portions 213, 215). The main body portion 221 of the second reflector 220 has a thickness $T_3$ and the first and second side body portions 223, 225 each have a thickness $T_4$. In this exemplary embodiment, $T_3$ is greater than $T_4$ (i.e., the main body portion 221 has a thickness that is greater than the thickness of each of the first and second side body portions 223, 225).

FIG. 2E shows the chamfers present in the reflectors. Again, an upper face 231 and a lower face 233 of the third reflector 230 are labeled. Similarly, an upper face 241 and a lower face 243 of the fourth reflector 240 are also labeled, again with the upper face 241 of the fourth reflector 240 facing the lower face 243 of the fourth reflector 240. The inner edges of the third and fourth reflectors 230, 240 bound by the first and second reflectors 210, 220 are chamfered. That is, third reflector 230 includes two chamfers 230a and 230b, and fourth reflector 240 also includes two chamfers 240a and 240b. More particularly, the first chamfer 230a of the third reflector 230 is located between the upper face 231 and the inner face 232 of the third reflector 230, and the second chamfer 230b of the third reflector 230 is located between the upper face 231 and the inner face 232 of the third reflector 230. Compared to FIG. 1E, the two outer corners (i.e., the corners of the third reflector 230 proximate the outer face 234 thereof) of the third reflector 230 do not need to be chamfered because these edges do not encounter a corner, and generally do not engage in sliding contact with the first reflector or second reflectors. Similarly, the first chamfer 240a of the fourth reflector 240 is located between the upper face 241 and the inner face 244 of the fourth reflector 240, and the second chamfer 240b of the fourth reflector 240 is located between the upper face 241 and the inner face 242 of the fourth reflector 140. Again, the two outer corners of the fourth reflector 240 (i.e., the corners of the fourth reflector 240 proximate the outer face 244 thereof) do not need to be chamfered. Again, the chamfers are illustrated here as having a rounded shape, but other shapes can also be used.

Figure 3A:
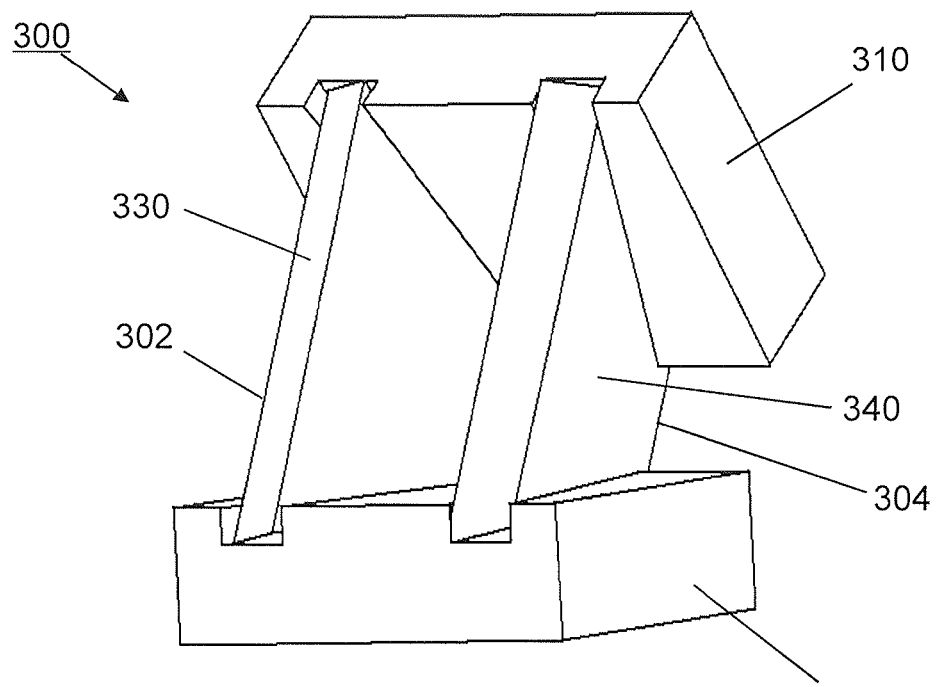
FIG. 3A is a perspective view of a first exemplary light funnel according to the present disclosure.
Figure 3B:
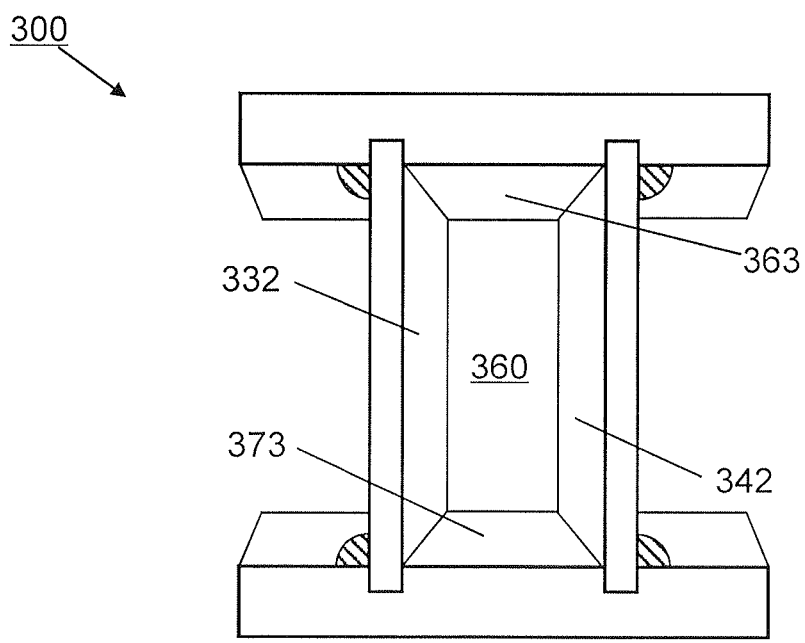
FIG. 3B is a front view of the third exemplary light tunnel of FIG. 3A.

FIG. 3A is a perspective view of a third exemplary light tunnel according to the present disclosure. FIG. 3B is a front view of the third exemplary light tunnel of FIG. 3A. This embodiment may be considered a light funnel. The third exemplary light funnel 300 is very similar to the first exemplary light tunnel 100 of FIG. 1A in being formed from four reflectors 310, 320, 330, 340, and the notches in the first and second reflectors 310, 320 have three sides. To form the light funnel, as seen in FIG. 3B, the inner faces 363, 373 of the first and second reflectors 310,320 each have a substantially rectangular profile. The inner faces 332, 342 of the third and fourth reflectors 330,340 each have a substantially trapezoidal profile. Ideally, the trapezoidal profile is an isosceles trapezoid profile, i.e. the angled sides have the same length. The angled sides of the third and fourth reflectors 330, 340 engage the notches in the first and second reflectors 310, 320. As a result, the cross-sectional area of the light funnel 300 is larger at one end 302 than the other end 304 in the light passage 360 formed by the four reflectors. It is noted that the inner faces of the first and second reflectors (having the notches) could have the substantially trapezoidal profile, with the inner faces of the third and fourth reflectors having the substantially rectangular profile.

Figure 4A:
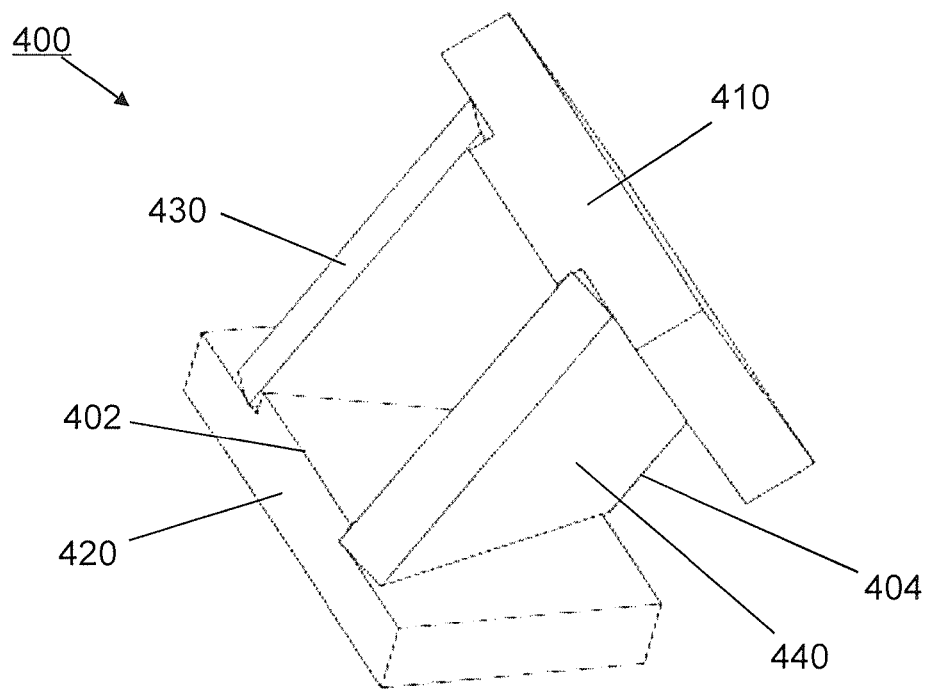
FIG. 4A is a perspective view of a second exemplary light funnel according to the present disclosure.
Figure 4B:
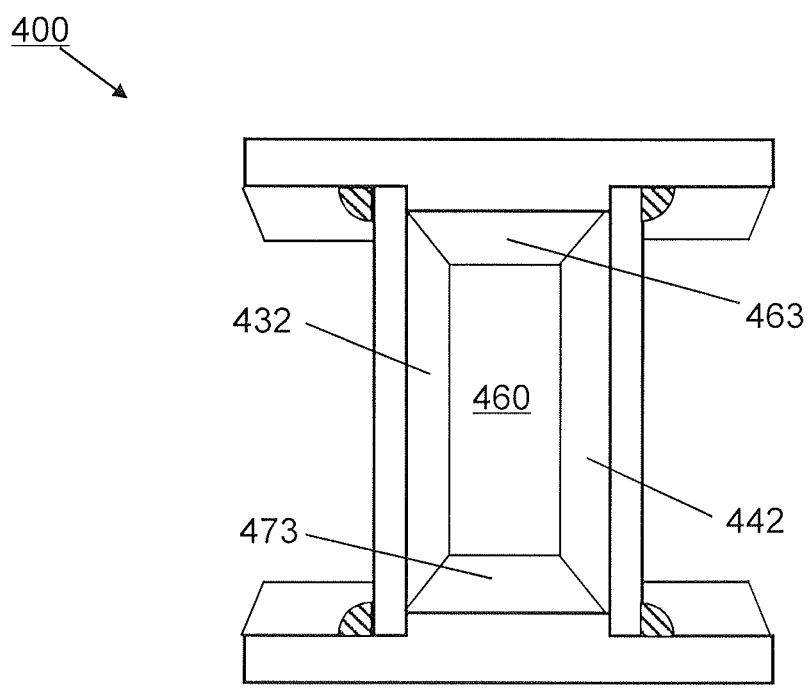
FIG. 4B is a front view of the fourth exemplary light tunnel of FIG. 4A.

FIG. 4A is a perspective view of a fourth exemplary light tunnel according to the present disclosure. FIG. 4B is a front view of the fourth exemplary light tunnel of FIG. 4A. The fourth exemplary light funnel 400 is very similar to the second exemplary light tunnel 200 in that the notches have only two sides, with the inner faces 463, 473 being located on raised steps. Thus, again for sake of brevity, many similar characteristics between the second exemplary light tunnel 200 and the fourth exemplary light funnel 400 will not be repeated.

To form the light funnel, as seen in FIG. 4B, the inner faces 463, 473 of the first and second reflectors 410, 420 each have a substantially rectangular profile. The inner faces 432, 442 of the third and fourth reflectors 430, 440 each have a substantially trapezoidal profile. Ideally, the trapezoidal profile is an isosceles trapezoid profile, i.e. the angled sides have the same length. The angled sides of the third and fourth reflectors 430, 440 engage the notches in the first and second reflectors 410, 420. As a result, the cross-sectional area of the light funnel 400 is larger at one end 402 than the other end 404 in the light passage 460 formed by the four reflectors. It is noted that the inner faces of the first and second reflectors (having the notches) could have the substantially trapezoidal profile, with the inner faces of the third and fourth reflectors having the substantially rectangular profile.

It is noted that the light funnel embodiments shown in FIG. 3B and FIG. 4B do not have chamfered edges. However, it is contemplated that chamfers may be included in these light funnels as well.

Figure 5A:
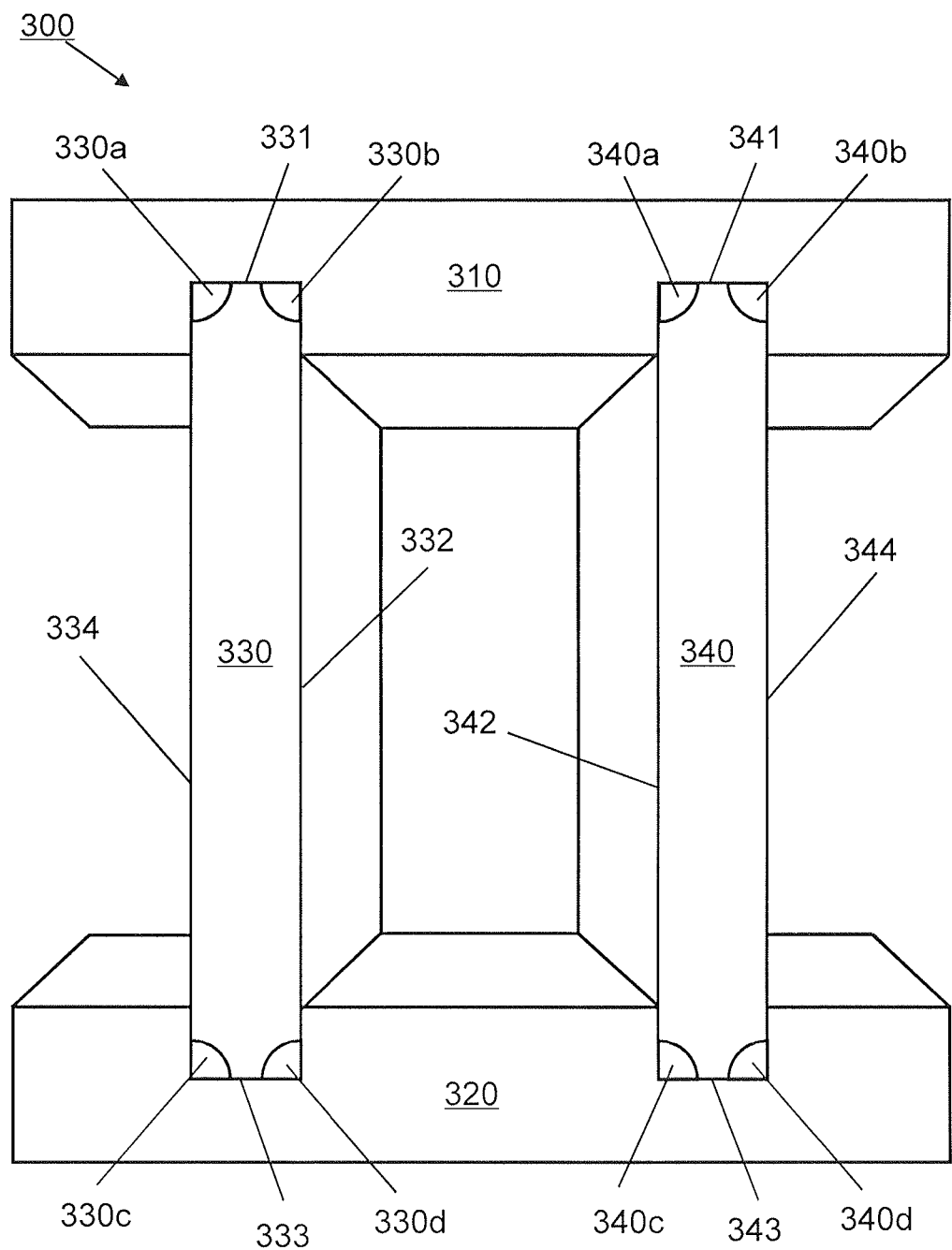
FIG. 5A is another assembled front view of the first exemplary light funnel of FIG. 3A showing chamfers as an additional feature thereof.

FIG. 5A shows additional features of the first exemplary light funnel 300. As can be seen here, third reflector 330 of light funnel 300 includes four chamfers 330a, 330b, 330c, 330d and fourth reflector 340 of light funnel 300 includes four chamfers 340a, 340b, 340c, 340d. The four chamfers of each of the third and fourth reflectors of light funnel 300 of FIG. 5A are as described with respect to the four chamfers of each of the third and fourth reflectors of light tunnel 100 of FIG. 1E.

Figure 5B:
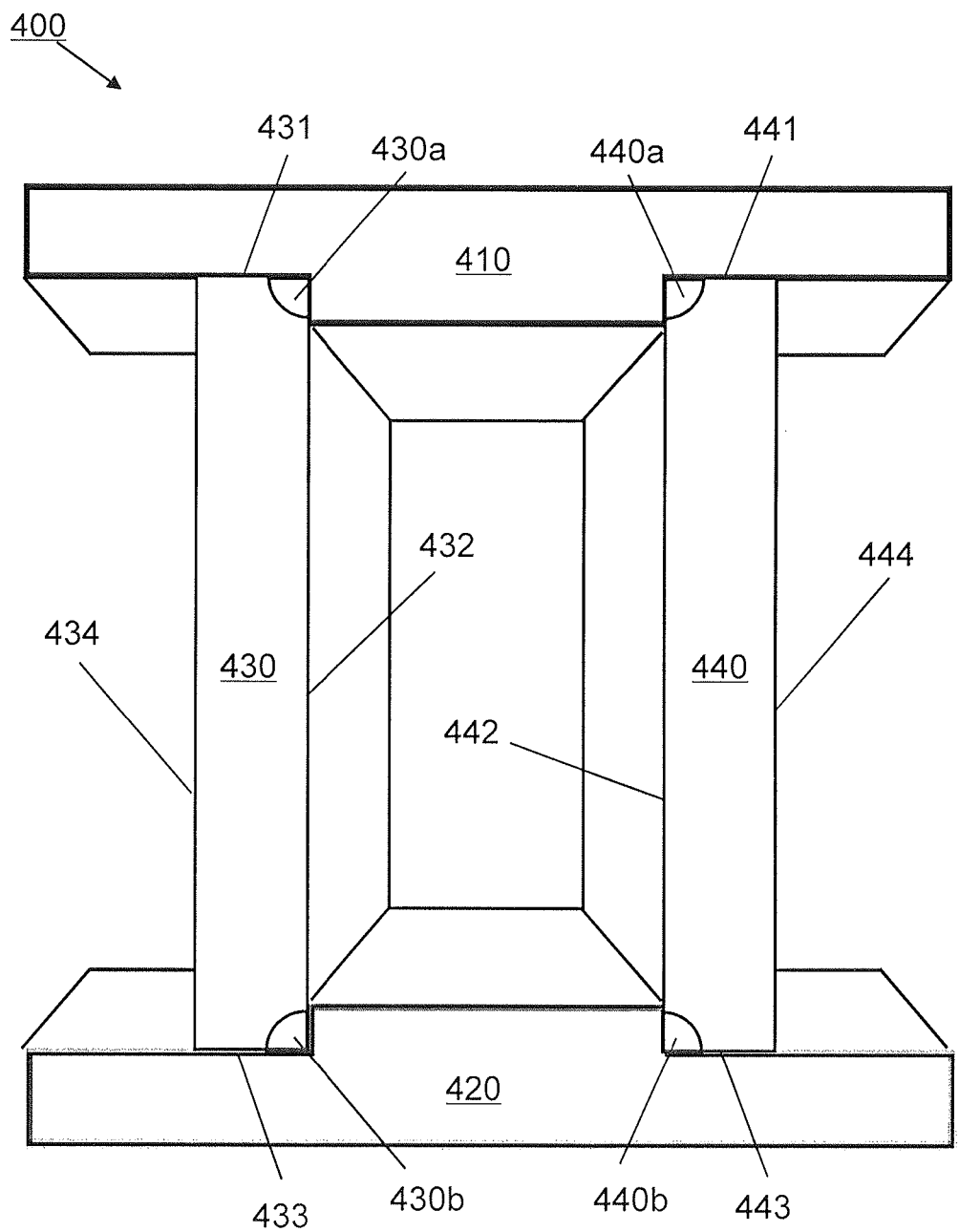
FIG. 5B is another assembled front view of the second exemplary light funnel of FIG. 4A showing chamfers as an additional feature thereof.

FIG. 5B shows additional features of the second exemplary light funnel 400. As can be seen in FIG. 5B, third reflector 430 of light funnel 440 includes two chamfers 430a and 430b and fourth reflector 440 of light funnel 300 includes two chamfers 440a and 440b. The two chamfers of each of the third and fourth reflectors of light funnel 400 of FIG. 5B are as described with respect to the two chamfers of each of the third and fourth reflectors of light tunnel 200 of FIG. 2E.

Figure 6:
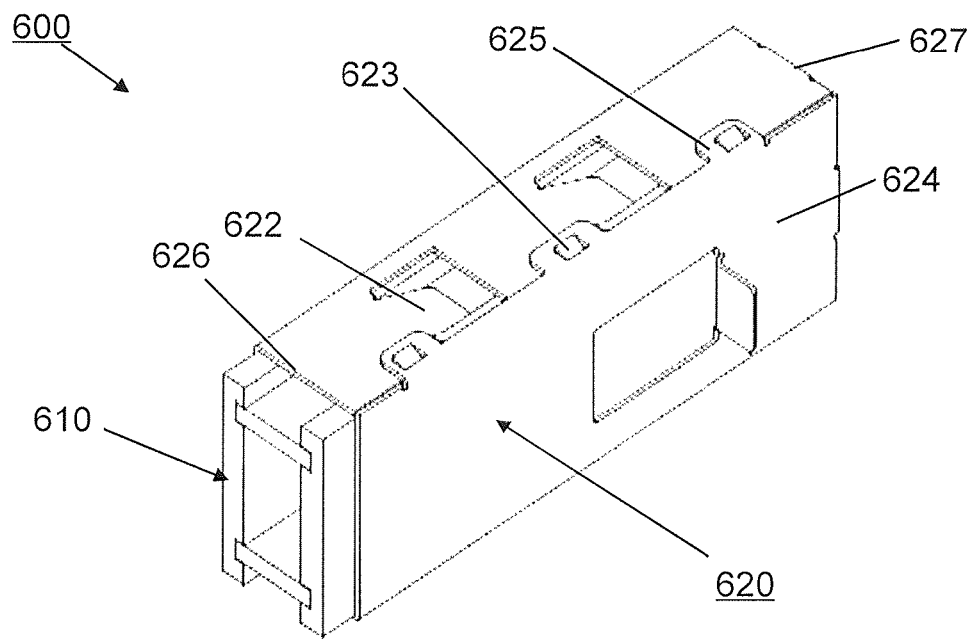
FIG. 6 is a perspective view of a first exemplary apparatus according to the present disclosure. The apparatus includes a light tunnel and a housing for protecting, supporting, and positioning the light tunnel.

FIG. 6 is a perspective view of a first exemplary apparatus according to the present disclosure. The first exemplary apparatus 600 includes a light tunnel 610 and a housing 620. The light tunnel 610 can be constructed as provided throughout the present disclosure, and is illustrated here as constructed in FIGS. 1A-1D. The housing 620 completely or substantially encloses the light tunnel 610, and is used for maintaining the parts of the light tunnel 610 relative to each other. As a result, the reflectors of the light tunnel can be secured without the need for any adhesive. That is, the apparatuses of the present disclosure can be constructed with no adhesive present between the housing and the light tunnel. Further, because the housing is used as the support for securing the reflectors together, the third and fourth reflectors can cooperatively engage with the first and second reflectors without the use of any adhesive.

The housing 620 in this exemplary embodiment also has four sides. One side here serves as a strike plate 622 having three upward lips 623. The strike plate also has a front edge 626 and a rear edge 627, which are aligned with the front and rear ends of the light tunnel. An adjacent side 624 includes three clasps 625, which are positioned to engage the upward lips and fix the housing 620 about the light tunnel 610. Put another way, the light tunnel 610 is fixed in position relative to the housing 620.

Figure 7:
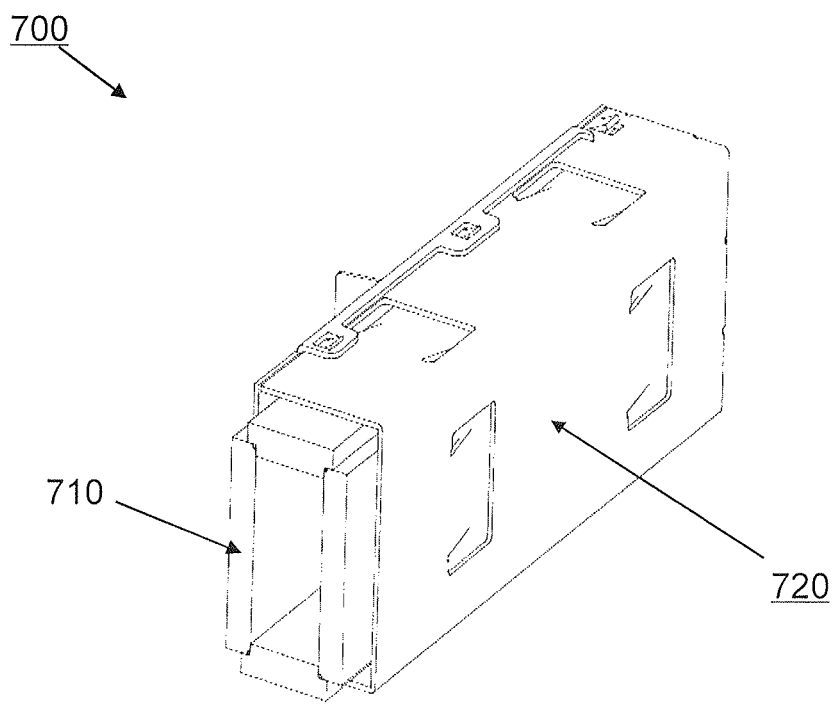
FIG. 7 is a perspective view of a second exemplary apparatus according to the present disclosure. The apparatus includes a light tunnel and a housing for protecting, supporting, and positioning the light tunnel.

FIG. 7 is a perspective view of a second exemplary apparatus according to the present disclosure. The second exemplary apparatus 700 includes a light tunnel 710 and a housing 720. The light tunnel 710 is illustrated here as constructed in FIGS. 2A-2D. The housing is as described with respect to FIG. 5. Again, the light tunnel 710 could alternatively be constructed as a light funnel, such as the light funnel illustrated in FIG. 4A and FIG. 4B, with the housing 720 constructed with tapered walls to accommodate the light funnel.

The use of a housing 620, 720 in place of adhesive is particularly advantageous given that many organic adhesives face particular temperature limitations and inorganic adhesives that may be capable of operating at higher temperatures typically have a weak bonding strength and require a complex dispensing process to apply. Thus, the housing can, in certain embodiments, be formed from a metal or other suitable material capable of withstanding high operating temperatures (e.g., greater than 300° C.). The use of the housing also enhances the bonding force of the four reflectors that make up the light tunnel, so that the bonding force can be up to about 10 times greater than that of conventional light tunnels that use only an adhesive for securing the reflectors together. Further yet, the use of a housing shortens the required assembly time by about 75% compared to assembly times for conventional light funnels requiring the use of adhesive.

It is also contemplated that the housings could be used with the light funnels of FIG. 3A and FIG. 4A. The light tunnel 610 could alternatively be constructed as a light funnel, such as the light funnel illustrated in FIG. 3A and FIG. 3B, with the housing 620 constructed with tapered walls to accommodate the light funnel. In addition, downward lips extending from the front and rear edges 626, 627 may be needed to keep the light funnel within the housing.

The notched construction of the present disclosure is more robust than conventional constructions, is capable of achieving increased bonding forces up to 10 times greater or more, and greatly reduces assembly times by 75% or more (as compared to conventional adhesive bonding techniques). Further, the notched construction eliminates or retards adhesive leakage into the light passage and light leakage out of the light passage. The notches in the inner faces of the reflectors can be formed, for example, by sawing, dicing, milling, laser cutting, or any other suitable process.

Figure 8:
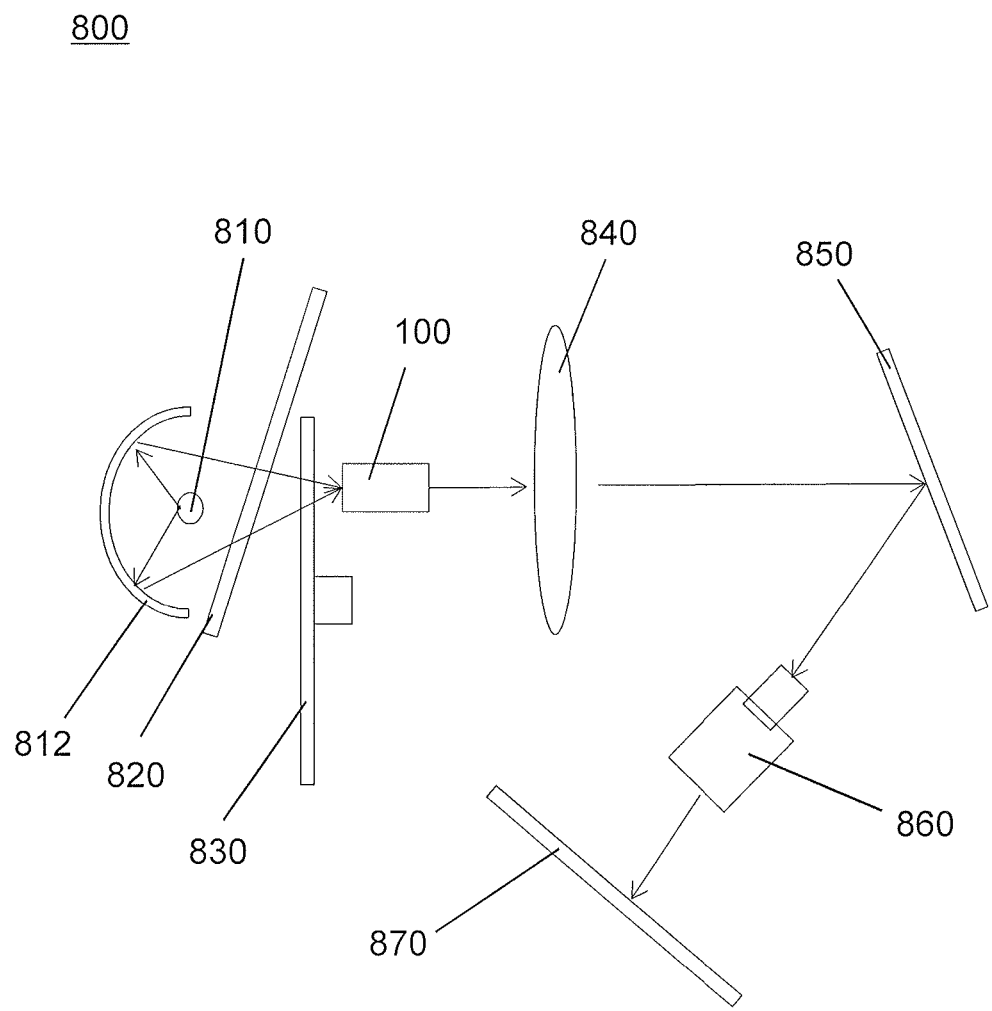
FIG. 8 is a schematic illustration of a first exemplary projection system including a light tunnel or light funnel according to the present disclosure.

FIG. 8 illustrates a projection system 800 incorporating a light tunnel or light funnel (i.e., 100, 200, 300, or 400) or light tunnel apparatus (i.e., 600 or 700) according to the present disclosure. In this exemplary embodiment, light tunnel 100 is shown as part of the projection system 800. The projection system 800 further includes a light source 810 configured to produce light. In this regard, the light source 810 can be, for example, a high-intensity discharge (HID) lamp. As seen in FIG. 8, the light source 810 is surrounded by a reflector 812 (e.g., a reflective film or sheet). The reflector 812 surrounding the light source 810 is configured to reflect and converge emitted light in the direction of a color wheel 830.

Here, the light source 810 is positioned between the reflector 812 and the color wheel 830, and is optically aligned therewith. Put another way, the reflector 812 is located on one side of the light source 810 opposite the color wheel 830. The color wheel 830 faces the light source 810 opposite the reflector 812. As light passes through the color wheel 830, the light enters the light tunnel 100, within which the light is collimated and homogenized to achieve a uniform distribution, as explained herein. That is, the light distribution is non-uniform before entering the light tunnel, such that the greatest brightness is seen in the center and gradually reduces from the center outwardly toward the edge(s).

Figure 9A:
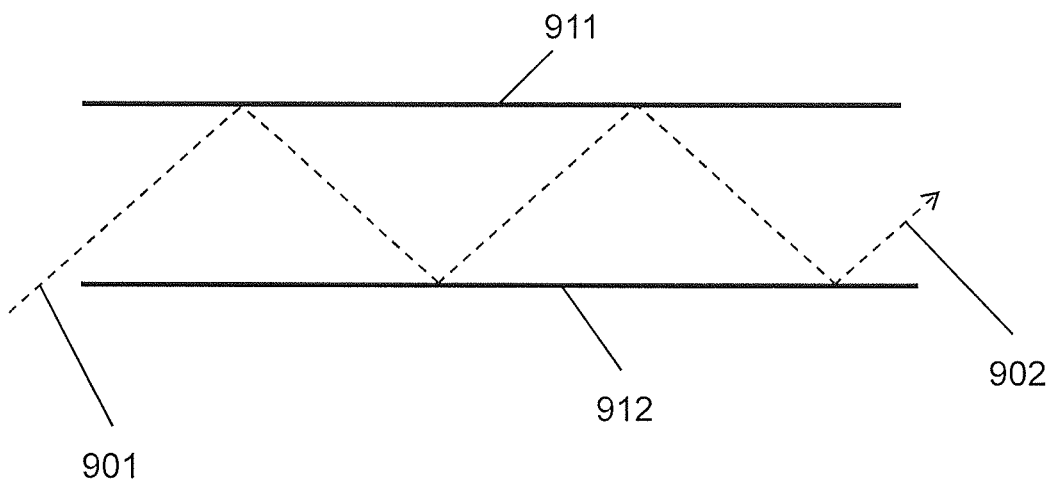
FIG. 9A is a schematic illustration of how light is reflected in a light tunnel.

When the light enters the light tunnel, it is reflected multiple times by the reflectors thereof, as shown in FIG. 9A, thereby achieving a uniform distribution of the light (e.g., thereby achieving energy uniformity) from the center of the tunnel to the edges. This figure shows the path of a light beam entering the tunnel (901) and reflecting off the inner faces 911, 912 of the light tunnel, then exiting the tunnel (902).

Referring back to FIG. 8, upon exiting the light tunnel 100, the light passes through a lens 840 (e.g., a relay lens) disposed adjacent to the light tunnel 100. That is, the light tunnel 100 is positioned between the color wheel 830 and the lens 840, and is optically aligned therewith. The lens 840 converges the light onto an image generation device 850. The image generation device 850 can be, for example, a digital micro-mirror device (DMD). Generally, a DMD includes a plurality of micromirrors configured to reflect light by digital light processing (DLP) technology, such as in the direction of a projecting unit 860. In this way, light is reflected off of the image generation device 850 toward the projecting unit 860, after which the light is directed out of the projecting unit 860, such as to project an image on to a screen 870. Where desired, an additional device 720 can be positioned between the color wheel 830 and the light source 810. The additional device 820 can, for example, be a UV/IR filter that separates the UV light and IR light emitted by the light source, thereby retaining light in the 380-800 nm wave band. IR light (>800 nm) causes more heat in the projection system, while UV light causes plastic parts in the projection system to age at an accelerated pace.

Figure 9B:
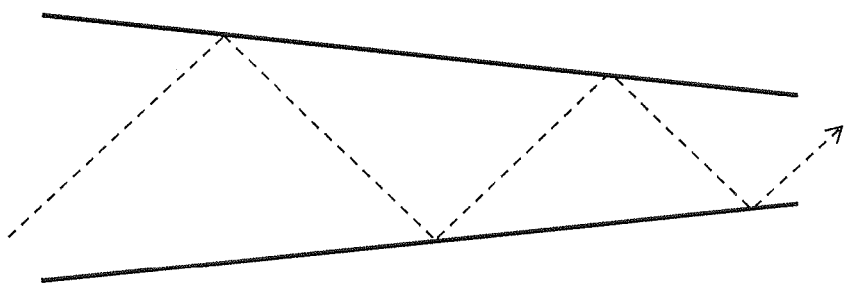
FIG. 9B is a schematic illustration of how light is reflected in a light funnel.

In the case of light funnel 300 or 400, the incoming light is also converged in the light funnel, such as is shown in FIG. 9B. In this way, lens 840 (e.g., a condenser lens) matches the light tunnel outlet opening size to the size of the DMD. Due to the reflectivity times of incident light being different in light tunnels and light funnels, a shorter light funnel could be employed in a projection system than a light tunnel, thus saving space within the projection system.

Figure 12A:
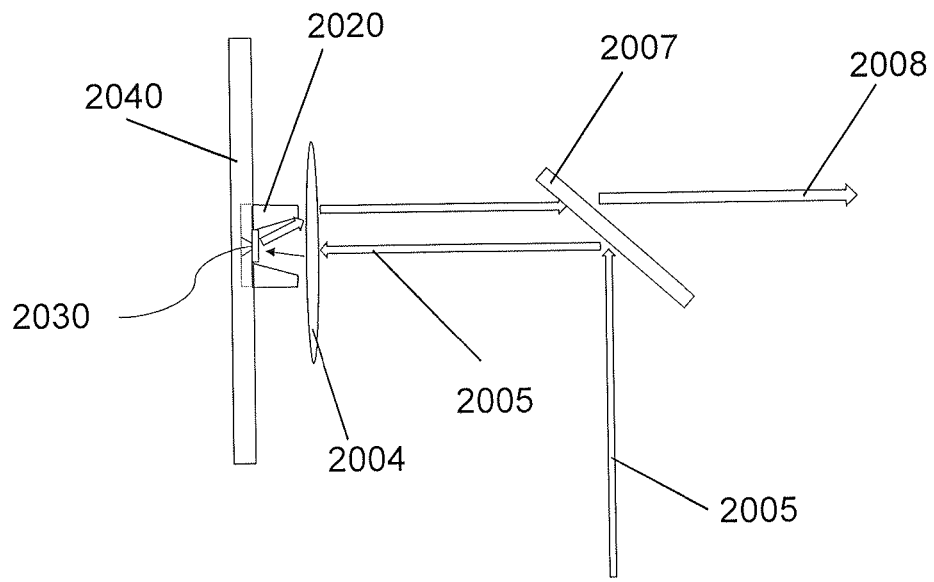
FIG. 12A is a side view of a lighting system using a light funnel.
Figure 12B:
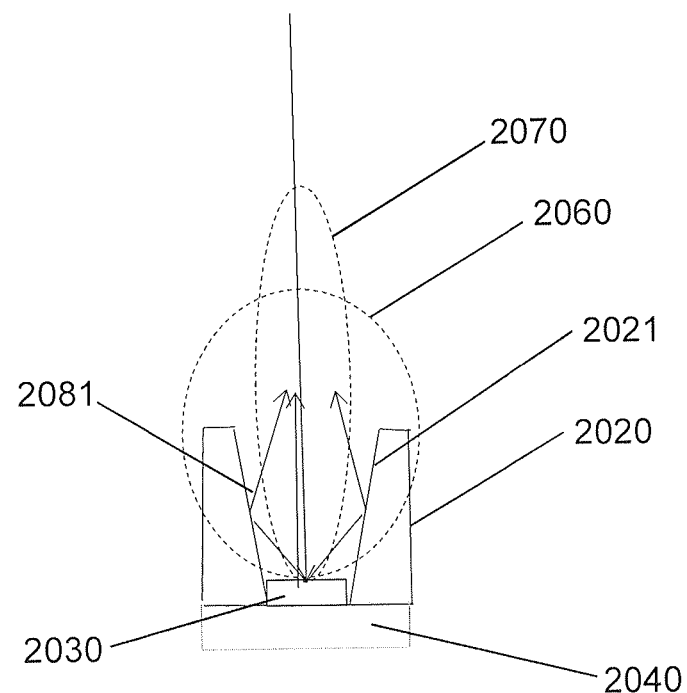
FIG. 12B is a top view of the same lighting system.

FIG. 12A and FIG. 12 B show the application of a light funnel in a lighting system. Excitation light 2005 (e.g., blue light) of a first wavelength distribution passes through a focus lens 2004. The focus lens focuses the light on to a phosphor material 2030 located on substrate 2040, thereby stimulating the phosphor material 2030. The phosphor material 2030 then emits light having a Lambertian distribution, shown as curve 2060 in FIG. 12B. A light funnel 2020 adjusts the light distribution of the phosphor material 2030 to a spindle distribution by reflecting light rays 2081 off of the inner faces 2021 of the light funnel 2020, such as is illustrated in FIG. 9B. The modified light distribution is shown as curve 2070 of FIG. 12B. In this way, the light funnel 2020 helps the focus lens 2004 collect more emission light and transmit it to the subsequent light system, thereby improving the utilization rate of the emission light. The emission light then passes through a dichroic mirror 2007 (indicated with reference numeral 2008) and then to the remainder of the lighting system. The dichroic mirror 2007 reflects the blue light, while allowing light having a second wavelength distribution different from blue light to pass therethrough.

In addition to the aforementioned potential advantages of using a light funnel for certain applications, light funnels may be particularly advantageous to use in light systems as well. Generally, a light funnel can be used to adjust emitted light from a Lambertian distribution (i.e., homogenous distribution) to a spindle distribution$_{[GH3]}$(non-homogenous spatial distribution), helping the light energy to focus under a small space angle.

The present disclosure has been described with reference to preferred embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:
1. A light tunnel, comprising:
 a first reflector having a primary face and an opposite secondary face, the primary face of the first reflector being divided into an inner face located between a first notch and a second notch, a first primary side face, and a second primary side face;

a second reflector opposite the first reflector, the second reflector having a primary face and an opposite secondary face, the primary face of the second reflector being divided into an inner face located between a first notch and a second notch, a first primary side face, and a second primary side face;

a third reflector having an inner face, an opposite outer face, an upper end with an upper face, an opposite lower end with a lower face, an upper inner chamfer located at a corner between the inner face and the upper face, and a lower inner chamfer located at a corner between the inner face and the lower face, the upper end of the third reflector cooperatively engaging the first notch of the first reflector, and the lower end of the third reflector cooperatively engaging the first notch of the second reflector, such that the third reflector connects the first and second reflectors;

a fourth reflector opposite the third reflector, the fourth reflector having an inner face, an opposite outer face, an upper end with an upper face, an opposite lower end with a lower face, an upper inner chamfer located at a corner between the inner face and the upper face, and a lower inner chamfer located at a corner between the inner face and the lower face, the upper end of the fourth reflector cooperatively engaging the second notch of the first reflector, and the lower end of the fourth reflector cooperatively engaging the second notch of the second reflector, such that the fourth reflector connects the first and second reflectors; and an adhesive applied to at least one junction between (A) the first or second primary side face of either the first reflector or the second reflector; and (B) the outer face of the third reflector or the fourth reflector.

2. The light tunnel of claim 1, wherein the third reflector further comprises an upper outer chamfer located at a corner between the outer face and the upper face, and a lower outer chamfer located at a corner between the outer face and the lower face; and wherein the fourth reflector further comprises an upper outer chamfer located at a corner between the outer face and the upper face, and a lower outer chamfer located at a corner between the outer face and the lower face.

3. The light tunnel of claim 1, wherein the first and second reflectors are each defined by a main body portion and opposing first and second side body portions extending outwardly away from the main body portion beyond the first and second notches respectively.

4. The light tunnel of claim 3, wherein the main body portion of each of the first and second reflectors has a thickness that is substantially equal to a thickness of the first body portion and a thickness of the second side body portion.

5. The light tunnel of claim 3, wherein the main body portion of each of the first and second reflectors has a thickness that is greater than both a thickness of the first body portion and a thickness of the second side body portion.

6. The light tunnel of claim 3, wherein in both the first reflector and the second reflector, the first side body portion has a width that is greater than or equal to one-half a width of the first notch.

7. The light tunnel of claim 1, wherein the inner faces of the first, second, third, and fourth reflectors each have a substantially rectangular profile, such that the light tunnel has a substantially constant cross-sectional area from a first end of the light tunnel to a second end thereof.

8. The light tunnel of claim 1, wherein the inner faces of each of the first, second, third, and fourth reflectors are coated with a reflective film.

9. The light tunnel of claim 1, wherein adhesive is applied to:
(i) a first junction between the first primary side face of the first reflector and the outer face of the third reflector;
(ii) a second junction between the first primary side face of the second reflector and the outer face of the third reflector;
(iii) a third junction between the second primary side face of the first reflector and the outer face of the fourth reflector; and
(iv) a fourth junction between the second primary side face of the second reflector and the outer face of the fourth reflector.

10. An apparatus, comprising:
(a) the light tunnel of claim 1; and
(b) a housing substantially enclosing the light tunnel, the housing including a spring plate configured to fix the relative position of the light tunnel and the housing.

11. A light funnel, comprising:
a first reflector having a primary face and an opposite secondary face, the primary face of the first reflector being divided into an inner face located between a first notch and a second notch, a first primary side face, and a second primary side face;
a second reflector opposite the first reflector, the second reflector having a primary face and an opposite secondary face, the primary face of the second reflector being divided into an inner face located between a first notch and a second notch, a first primary side face, and a second primary side face;
a third reflector having an inner face, an opposite outer face, an upper end, and an opposite lower end, the upper end of the third reflector cooperatively engaging the first notch of the first reflector, and the lower end of the third reflector cooperatively engaging the first notch of the second reflector, such that the third reflector connects the first and second reflectors;
a fourth reflector having an inner face, an opposite outer face, an upper end, and an opposite lower end, the upper end of the fourth reflector cooperatively engaging the second notch of the first reflector, and the lower end of the fourth reflector cooperatively engaging the second notch of the second reflector, such that the fourth reflector connects the first and second reflectors; and
an adhesive applied to at least one junction between (A) the first or second primary side face of either the first reflector or the second reflector; and (B) the outer face of the third reflector or the fourth reflector;
wherein either (A) the inner faces of the first and second reflectors each have a substantially rectangular profile, and the inner faces of the third and fourth reflectors each have a substantially trapezoidal profile; or (B) the inner faces of the first and second reflectors each have a substantially trapezoidal profile, and the inner faces of the third and fourth reflectors each have a substantially rectangular profile, such that the light funnel has a cross-sectional area that decreases from a first end of the light funnel to a second end thereof.

12. The light funnel of claim 11, wherein the third reflector further comprises an upper face at the upper end, a lower face at the lower end, an upper inner chamfer located at a corner between the inner face and the upper face, and a lower inner chamfer located at a corner between the inner face and the lower face; and wherein the fourth reflector further comprises an upper face at the upper end, a lower face at the lower end, an upper inner chamfer located at a corner between the inner face and the upper face, and a lower inner chamfer located at a corner between the inner face and the lower face.

13. The light funnel of claim 12, wherein the third reflector further comprises an upper outer chamfer located at a corner between the outer face and the upper face, and a lower outer chamfer located at a corner between the outer face and the lower face; and wherein the fourth reflector further comprises an upper outer chamfer located at a corner between the outer face and the upper face, and a lower outer chamfer located at a corner between the outer face and the lower face.

14. The light funnel of claim 11, wherein the first and second reflectors are each defined by a main body portion and opposing first and second side body portions extending outwardly away from the main body portion beyond the first and second notches respectively.

15. The light funnel of claim 14, wherein in both the first reflector and the second reflector, the first side body portion has a width that is greater than or equal to one-half a width of the first notch.

16. The light funnel of claim 11, wherein the inner faces of each of the first, second, third, and fourth reflectors are coated with a reflective film.

17. The light funnel of claim 11, wherein adhesive is applied to:

(i) a first junction between the first primary side face of the first reflector and the outer face of the third reflector;

(ii) a second junction between the first primary side face of the second reflector and the outer face of the third reflector;

(iii) a third junction between the second primary side face of the first reflector and the outer face of the fourth reflector; and (iv) a fourth junction between the second primary side face of the second reflector and the outer face of the fourth reflector.

18. An apparatus, comprising:
(a) the light funnel of claim 11; and
(b) a housing substantially enclosing the light funnel, the housing including a spring plate configured to fix the relative position of the light funnel and the housing.

19. A projection system, comprising:
a light source configured to produce excitation light;
a wavelength conversion material that absorbs the excitation light and generates emission light; and
the light funnel of claim 11, wherein the light funnel homogenizes the emission light of the wavelength.

20. A lighting system, comprising:
a phosphor material that receives excitation light and emits light having a first distribution; and
the light funnel of claim 11, wherein the light funnel adjusts the emitted light to a second distribution different than the first distribution.

21. A method for forming a light tunnel, the method comprising:

forming first and second notches in a primary face of a first reflector having a primary face and an opposite secondary face, the primary face of the first reflector being divided into an inner face located between the first notch and the second notch, a first primary side face, and a second primary side face;

forming first and second notches in a primary face of a second reflector having a primary face and an opposite secondary face, the primary face of the second reflector being divided into an inner face located between the first notch and the second notch, a first primary side face, and a second primary side face;

engaging an upper end of a third reflector with the first notch of the first reflector, the upper end having at least one chamfer;

engaging a lower end of the third reflector with the first notch of the second reflector, the lower end having at least one chamfer;

engaging an upper end of a fourth reflector with the second notch of the first reflector, the upper end having at least one chamfer;

engaging a lower end of the fourth reflector with the second notch of the second reflector, the lower end having at least one chamfer; and applying an adhesive to at least one junction between (A) the first or second primary side face of either the first reflector or the second reflector; and (B) the outer face of the third reflector or the fourth reflector.

\* \* \* \* \*